United States Patent
Li et al.

(10) Patent No.: US 12,293,582 B2
(45) Date of Patent: May 6, 2025

(54) VIDEO PROCESSING PACKAGE

(71) Applicant: TENCENT TECHNOLOGY (SHENZHEN) COMPANY LIMITED, Guangdong (CN)

(72) Inventors: Xue Li, Shenzen (CN); Wei Xiong, Shenzen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/493,730

(22) Filed: Oct. 24, 2023

(65) Prior Publication Data

US 2024/0054784 A1 Feb. 15, 2024

Related U.S. Application Data

(63) Continuation of application No. 17/010,549, filed on Sep. 2, 2020, now Pat. No. 11,854,263, which is a (Continued)

(30) Foreign Application Priority Data

Jul. 23, 2018 (CN) .......................... 201810814346.3

(51) Int. Cl.
*G06V 20/40* (2022.01)
*G06F 18/214* (2023.01)
*H04N 23/80* (2023.01)

(52) U.S. Cl.
CPC ............ *G06V 20/41* (2022.01); *G06F 18/214* (2023.01); *G06V 20/46* (2022.01); *H04N 23/80* (2023.01)

(58) Field of Classification Search
CPC ........... H04N 5/23229; H04N 5/23219; H04N 5/23222; H04N 1/00127; H04N 1/32128;
(Continued)

(56) References Cited

U.S. PATENT DOCUMENTS 8,208,694 B2 6/2012 Jelonek et al.
9,143,542 B1 9/2015 Tseytlin
(Continued)

FOREIGN PATENT DOCUMENTS

CN 101247482 A 8/2008
CN 103413270 A 11/2013
(Continued)

OTHER PUBLICATIONS

International Search Report in PCT/CN2019/097292, mailed Oct. 24, 2019, 3 pages.
(Continued)

*Primary Examiner* — Michael S Osinski
(74) *Attorney, Agent, or Firm* — ArentFox Schiff LLP

(57) ABSTRACT

In a video processing method, a target video is received. Scene description information of a shooting scene in the target video is obtained. The scene description information indicates features of the shooting scene in the target video. A video processing package that corresponds to the shooting scene in the target video is obtained based on the scene description information. The video processing package is configured to add at least one content to the target video. The at least one content is added to the target video based on the video processing package.

20 Claims, 11 Drawing Sheets

Related U.S. Application Data continuation of application No. PCT/CN2019/097292, filed on Jul. 23, 2019.

(58) Field of Classification Search
CPC ........... H04N 21/25891; H04N 21/812; H04N 2201/3225; H04N 2201/3274; G06K 9/6256; G06K 9/6215; G06K 9/6262; G06K 9/6267; G06V 20/41; G06V 20/46; G06V 30/194; G06V 40/161; G06V 40/16; G06V 30/10; G06V 10/40; G06V 10/82; G06V 20/35; G06V 40/165; G06V 40/168; G06V 40/178; G06V 10/454; G06V 10/751; G06V 30/153; G06T 11/60; G06T 2207/10024; G06T 2207/30201; G06T 2207/20076; G06T 5/00; G06T 7/194; G06T 7/70; G06T 2207/20004; G06T 2207/20021; G06T 2207/20081; G06T 2207/20084; G06T 3/40; G06T 5/003; G06T 5/005; G06N 3/0454; G06N 3/08; G06N 20/10; G06N 3/04; G06N 3/0445; G06N 20/00; G06N 3/084; G06F 16/58; G06F 16/56; G06F 16/51; G06F 16/5838; G06F 16/7837

See application file for complete search history.

(56) References Cited

U.S. PATENT DOCUMENTS

| | | |
|---|---|---|
| 9,154,709 B2 | 10/2015 | Cohen et al. |
| 9,443,323 B2 | 9/2016 | Sato |
| 9,779,527 B2 | 10/2017 | Tang et al. |
| 9,898,847 B2 | 2/2018 | Wang |
| 9,965,880 B2 | 5/2018 | Shen et al. |
| 10,078,909 B1 | 9/2018 | Chen et al. |
| 10,163,022 B1 | 12/2018 | Cho |
| 10,181,203 B2 | 1/2019 | Lee et al. |
| 10,565,763 B2 | 2/2020 | Wang |
| 10,692,467 B2 | 6/2020 | Mafoodh et al. |
| 10,825,150 B2 | 11/2020 | Zeng |
| 10,979,624 B2 | 4/2021 | Liu et al. |
| 11,250,241 B2 | 2/2022 | Yan et al. |
| 11,323,659 B2 | 5/2022 | Ahn et al. |
| 11,589,091 B2 | 2/2023 | Chen et al. |
| 2008/0002892 A1 | 1/2008 | Jelonek et al. |
| 2010/0158375 A1 | 6/2010 | Okamoto |
| 2012/0038659 A1 | 2/2012 | Matsuguma et al. |
| 2013/0028520 A1 | 1/2013 | Kondo et al. |
| 2013/0128059 A1 | 5/2013 | Kristensson |
| 2014/0176732 A1 | 6/2014 | Cohen et al. |
| 2014/0314319 A1 | 10/2014 | Hamel et al. |
| 2015/0049924 A1 | 2/2015 | Tang et al. |
| 2015/0234564 A1* | 8/2015 | Snibbe .................... G06T 11/60 715/716 |
| 2015/0242684 A1 | 8/2015 | Arad et al. |
| 2016/0006927 A1 | 1/2016 | Sehn |
| 2016/0073004 A1 | 3/2016 | Nakano et al. |
| 2016/0173960 A1* | 6/2016 | Snibbe ............... H04N 21/2343 386/285 |
| 2016/0182940 A1 | 6/2016 | Assayag et al. |
| 2016/0196584 A1 | 7/2016 | Franklin et al. |
| 2017/0054898 A1 | 2/2017 | Sato |
| 2017/0289405 A1 | 10/2017 | Agrawal et al. |
| 2017/0301073 A1 | 10/2017 | Gao |
| 2017/0329502 A1 | 11/2017 | Wu |
| 2018/0191962 A1 | 7/2018 | Javier et al. |
| 2018/0196784 A1 | 7/2018 | Kumar et al. |
| 2019/0050681 A1 | 2/2019 | Tate |
| 2019/0108242 A1 | 4/2019 | Liu et al. |
| 2019/0108446 A1 | 4/2019 | Lyu et al. |
| 2019/0130538 A1 | 5/2019 | Zeng |
| 2019/0188889 A1 | 6/2019 | Kumar et al. |
| 2019/0272438 A1 | 9/2019 | Liu et al. |
| 2019/0377979 A1 | 12/2019 | Jiang et al. |
| 2020/0394216 A1 | 12/2020 | Tang et al. |

FOREIGN PATENT DOCUMENTS

| | | |
|---|---|---|
| CN | 104581199 A | 4/2015 |
| CN | 106547908 A | 3/2017 |
| CN | 107256221 A | 10/2017 |
| CN | 107730461 A | 2/2018 |
| EP | 3035283 | 6/2016 |

OTHER PUBLICATIONS

Written Opinion in PCT/CN2019/097292, mailed Oct. 24, 2019, 3 pages.

* cited by examiner

VIDEO PROCESSING PACKAGE

RELATED APPLICATIONS

This application is a continuation of U.S. application Ser. No. 17/010,549, "VIDEO PROCESSING METHOD AND APPARATUS, TERMINAL DEVICE, SERVER, AND STORAGE MEDIUM" filed on Sep. 2, 2020, which is a continuation of International Application No. PCT/CN2019/097292, filed on Jul. 23, 2019, which claims priority to Chinese Patent Application No. 201810814346.3, entitled "VIDEO PROCESSING METHOD AND APPARATUS, TERMINAL DEVICE, SERVER, AND STORAGE MEDIUM" and filed on Jul. 23, 2018. The entire disclosures of the prior applications are hereby incorporated by reference in their entirety.

FIELD OF THE TECHNOLOGY

This application relates to the field of information processing technologies, including to a video processing method and apparatus, a terminal device, a server, and a storage medium.

BACKGROUND OF THE DISCLOSURE

With the popularization of terminal devices and the improvement of network speeds, high-traffic spread content, for example, a short video, gradually gains favor of major social platforms. Currently, there have been a variety of applications (APPs) supporting shooting and publishing of a short video. A user may record a memorable scene in a form of a video, and may further publish the video, thereby implementing network sharing of the video.

To obtain a better video effect, before the video is shot, the user may select video processing manners, such as a filter, a beauty mode, a special effect, and background music, for processing the shot video. In the related art, each time the user selects a video processing manner, using a filter as an example, the user needs to first open filter options, and then selects a needed one from various filter effects. The operation process is relatively cumbersome and time-consuming. Particularly, more video processing manners for selection leads to lower efficiency. In other words, current matching efficiency of the video processing manners provided by a terminal device during video shooting is relatively low.

SUMMARY

Improving the matching efficiency of the video processing manners can improve a user's experience. Embodiments of this application provide a video processing method and apparatus, a terminal device, a server, and a storage medium, that can resolve a technical problem of relatively low matching efficiency of video processing manners.

According to a first aspect, a video processing method is provided. The method can include obtaining, by a terminal device, scene description information of a target shooting scene. The method can further include obtaining through matching, by the terminal device according to the scene description information, a target video processing package corresponding to the target shooting scene, the target video processing package including at least one video processing manner for processing a video in a predetermined processing mode, and processing, by the terminal device according to the target video processing package, a target video obtained by shooting the target shooting scene.

In this solution, the terminal device may automatically match a corresponding target video processing package according to scene description information, so that an operation of manually making a selection by a user in the related art is omitted. Further, matching efficiency of video processing manners may be improved. In addition, a plurality of video processing manners may be obtained through matching at a time, so that the matching efficiency is further improved. In addition, because the target video processing package is dynamically and correspondingly obtained through matching based on the scene description information, the target video processing package obtained through matching can be caused to accord with actual video content as much as possible. Further, accuracy of video processing may be improved, to satisfy an actual requirement of a user as much as possible.

In a possible design, the obtaining through matching, by the terminal device according to the scene description information, a target video processing package corresponding to the target shooting scene can further include performing, by the terminal device, word vector representation on the scene description information, to obtain a video content feature variable. Additionally, the obtaining step can also include inputting, by the terminal device, the video content feature variable into a pre-established package recommendation model for performing package matching, to obtain at least one recommended video processing package matching the scene description information, and determining, by the terminal device, the target video processing package according to the at least one recommended video processing package.

In this solution, the terminal device may obtain a target video processing package through matching by using a pre-established package recommendation model, so that relatively high matching efficiency can be achieved. In addition, a plurality of video processing packages may be recommended at a time by using the package recommendation model. In this way, the terminal device may select, according to an actual situation of the terminal device, one of the plurality of video processing packages as the finally used target video processing package, thereby improving applicability and universality of this solution.

In addition, the package recommendation model may be a model established by performing deep learning according to video content of a large quantity of videos that have been published. Therefore, the target video processing package obtained through matching in a manner of inputting the scene description information indicating an actual situation of a shooting scene into the package recommendation model may accord with, as much as possible, current video content that is actually shot. In this way, accuracy and effectiveness of target video effect processing may be improved as much as possible, and an actual usage requirement of a user is satisfied as much as possible.

In a possible design, the determining, by the terminal device, the target video processing package according to the at least one recommended video processing package can further include determining, by the terminal device, a video processing package with the highest usage frequency in the at least one recommended video processing package as the target video processing package. Alternatively, the determining step can include determining, by the terminal device, a video processing package having a maximum similarity with a priority video processing package in the at least one recommended video processing package as the target video processing package, the priority video processing package being a video processing package that is obtained through matching according to user attribute information.

In this solution, the terminal device may select, in different selection manners according to an actual usage scenario, one suitable package from a plurality of video processing packages recommended by the package recommendation model to process the target video, thereby enhancing diversity of the solution, and making the solution have a broader application range and stronger applicability. In addition, because the user attribute information is considered, a priority video processing package matching the user attribute information may alternatively be considered together during selection of a package. That is, an actual usage requirement of a user is used as a selection factor of selecting the target video processing package. In this way, the determined target video processing package may be more targeted to a specific extent, so that a determined result can accord with an actual preference of the user.

In a possible design, the determining, by the terminal device, the target video processing package according to the at least one recommended video processing package can also include determining, by the terminal device, whether there is a recommended video processing package having a similarity with a priority video processing package greater than or equal to a predetermined similarity in the at least one recommended video processing package, the priority video processing package being a video processing package that is obtained through matching according to user attribute information. The determining step can also include determining, by the terminal device in a case that there is a recommended video processing package having a similarity with the priority video processing package greater than or equal to the predetermined similarity in the at least one recommended video processing package, a recommended video processing package having a maximum similarity as the target video processing package, and determining, by the terminal device in a case that there is no recommended video processing package having a similarity with the priority video processing package greater than or equal to the predetermined similarity in the at least one recommended video processing package, the priority video processing package as the target video processing package.

In this solution, a preference setting of a user is used as an important selection condition. In this way, the finally obtained target video processing package may accord with an actual usage requirement of the user.

In a possible design, the obtaining through matching, by the terminal device according to the scene description information, a target video processing package corresponding to the target shooting scene includes inputting, by the terminal device, the scene description information into a preset set of correspondences between scenes and video processing packages for performing a matching search, to obtain a video processing package having the highest matching degree with the scene description information, and determining, by the terminal device, the video processing package having the highest matching degree with the scene description information as the target video processing package.

In this solution, the terminal device may automatically match appropriate video processing packages for different video shooting scenes by using the preset correspondences, to satisfy an actual shooting requirement of a user. In addition, the video processing packages may be customized by the user, to facilitate modification and updating at any time. Therefore, the actual shooting requirement of the user can be satisfied to a large extent.

In a possible design, the obtaining through matching, by the terminal device according to the scene description information, a target video processing package corresponding to the target shooting scene can further include determining separately, by the terminal device in a case that the scene description information indicates that a shot object in the target shooting scene changes, target video processing packages before and after the shot object changes. Additionally, the obtaining step can include that the processing, by the terminal device according to the target video processing package, a target video obtained by shooting the target shooting scene further includes processing separately, by the terminal device, a video obtained through shooting by using the corresponding target video processing packages before and after the shot object changes.

In this solution, the terminal device may correspondingly process a video by using different video processing packages before and after a scene changes. In this way, effectiveness of video processing may be improved.

In a possible design, the obtaining, by a terminal device, scene description information of a target shooting scene can further include obtaining, by the terminal device, a preview video of the target shooting scene, or obtaining, by the terminal device, the target video actually shot in the target shooting scene. The obtaining step can also include performing, by the terminal device, image recognition on a video sequence frame of the preview video or a video sequence frame of the target video, to obtain key feature information of each frame, the key feature information being feature information of a shot object occupying the largest area and/or visually presented in the foremost location in each frame, and determining, by the terminal device, the scene description information according to key feature information of all frames.

According to a second aspect, a video processing method is provided. The video processing method can include receiving, by a modeling server, scene description information of a target shooting scene transmitted by a terminal device, and performing, by the modeling server, word vector representation on the scene description information, to obtain a video content feature variable. Additionally, the video processing method can include inputting, by the modeling server, the video content feature variable into a pre-established package recommendation model for performing package matching, to obtain a target video processing package matching the target shooting scene, the target video processing package including at least one video processing manner for processing a video in a predetermined processing mode, and transmitting, by the modeling server, the target video processing package to the terminal device or a cloud server, to enable the terminal device or the cloud server to process, according to the target video processing package, a target video obtained by shooting the target shooting scene.

In a possible design, the inputting, by the modeling server, the video content feature variable into a pre-established package recommendation model for performing package matching, to obtain a target video processing package matching the target shooting scene can further include analyzing, by the modeling server, the video content feature variable, to determine an environment and/or categories and a quantity of objects corresponding to the target shooting scene. The inputting step can further include obtaining through matching, by the modeling server, one video processing manner for the determined environment and/or different categories of objects separately, and using, by the modeling server, a video processing package including a plurality of video processing manners obtained through matching as the target video processing package.

In this solution, the modeling server may obtain through matching one corresponding video processing manner for different objects separately. In this way, targeted differentiated processing may be performed on different categories of objects, to improve diversity of video processing as much as possible. In addition, because a set of video processing manners determined for each category of object is also recommended by the trained package recommendation model, popular requirements may also be satisfied as much as possible, to ensure universality of the solution.

In a possible design, the method further can further include obtaining, by the modeling server, user attribute information and/or historical viewing information of a user corresponding to the terminal device, and performing, by the modeling server, word vector representation on the user attribute information and/or the historical viewing information separately, to obtain an auxiliary feature variable. The method can additionally include that the inputting, by the modeling server, the video content feature variable into a pre-established package recommendation model for performing package matching, to obtain a target video processing package matching the target shooting scene includes inputting, by the modeling server, the video content feature variable and the auxiliary feature variable together into the pre-established package recommendation model for performing package matching, to obtain the target video processing package.

In this solution, the manner in which the modeling server uses the user attribute information and the historical viewing information as auxiliary recommendation factors also ensures that an actual factor of a user is considered in the recommendation process, thereby accurately recommending a package.

In a possible design, the package recommendation model can be established by selecting, by the modeling server, a plurality of videos from videos that have been published as video training samples, and marking, by the modeling server, shooting environments and/or shot objects of the video training samples based on image recognition results of video sequence frames included in the video training samples, to obtain video content tags of the video training samples. Additionally, the package recommendation model can be established by extracting, by the modeling server, video processing packages used by the video training samples, and inputting, by the modeling server, the video content tags of the video training samples and the corresponding video processing packages as training features into a preset network model for performing training and learning, to obtain the package recommendation model.

In a possible design, the inputting, by the modeling server, the video content tags of the video training samples and the corresponding video processing packages as training features into a preset network model for performing training and learning, to obtain the package recommendation model further include determining, by the modeling server, recommendation point values of the video training samples according to historical interaction data of the video training samples, the historical interaction data of the video training samples being used for indicating interaction statuses between users and the video training samples. The inputting step can also include performing, by the modeling server, training and learning after establishing associations between the recommendation point values of the video training samples and the corresponding video processing packages according to a predetermined association rule, to obtain the package recommendation model.

In a possible design, the performing, by the modeling server, training and learning after establishing associations between the recommendation point values of the video training samples and the corresponding video processing packages according to a predetermined association rule, to obtain the package recommendation model include performing, by the modeling server, association training on the video content tags and the corresponding video processing packages in the preset network model according to a principle that a training weight of a video processing package corresponding to a larger recommendation point value is larger, to obtain the package recommendation model. Alternatively, the performing step can include determining, by the modeling server, target video content tags whose recommendation point values are greater than or equal to a predetermined point value, and then performing association training on the target video content tags and corresponding video processing packages in the preset network model according to a principle that a training weight of a video processing package corresponding to a larger recommendation point value is larger, to obtain the package recommendation model.

According to a third aspect, a video processing method is provided. The video processing method can include receiving, by a cloud server, scene description information of a target shooting scene transmitted by a terminal device and a target video obtained by shooting the target shooting scene. The video processing method can also include receiving, by the cloud server, a target video processing package transmitted by the terminal device or a modeling server, the target video processing package being a video processing package that is obtained through matching according to the scene description information and that corresponds to the target shooting scene, and the target video processing package including at least one video processing manner for processing a video in a predetermined processing mode. Also, the video processing method can further include processing, by the cloud server, the target video according to the target video processing package.

According to a fourth aspect, a terminal device is provided. The terminal device can include processing circuitry that is configured to obtain scene description information of a target shooting scene. The processing circuitry can further be configured to obtain through matching, according to the scene description information, a target video processing package corresponding to the target shooting scene, the target video processing package including at least one video processing manner for processing a video in a predetermined processing mode, and to process, according to the target video processing package, a target video obtained by shooting the target shooting scene.

In a possible design, the processing circuitry can be further configured to perform word vector representation on the scene description information, to obtain a video content feature variable, input the video content feature variable into a pre-established package recommendation model for performing package matching, to obtain at least one recommended video processing package matching the scene description information, and determine the target video processing package according to the at least one recommended video processing package.

In a possible design, the processing circuitry can be configured to determine a video processing package with the highest usage frequency in the at least one recommended video processing package as the target video processing package. Alternatively, the processing circuitry can be configured to determine a video processing package having a maximum similarity with a priority video processing package in the at least one recommended video processing package as the target video processing package, the priority video processing package being a video processing package that is obtained through matching according to user attribute information.

In a possible design, the processing circuitry can be configured to determine whether there is a recommended video processing package having a similarity with a priority video processing package greater than or equal to a predetermined similarity in the at least one recommended video processing package, the priority video processing package being a video processing package that is obtained through matching according to user attribute information. Further the processing circuitry can be configured to determine, in a case that there is a recommended video processing package having a similarity with the priority video processing package greater than or equal to the predetermined similarity in the at least one recommended video processing package, a recommended video processing package having a maximum similarity as the target video processing package. Additionally, processing circuitry can be configured to determine, in a case that there is no recommended video processing package having a similarity with the priority video processing package greater than or equal to the predetermined similarity in the at least one recommended video processing package, the priority video processing package as the target video processing package.

In an exemplary embodiment, the processing circuitry can be configured to input the scene description information into a preset set of correspondences between scenes and video processing packages for performing a matching search, to obtain a video processing package having the highest matching degree with the scene description information, determine the video processing package having the highest matching degree with the scene description information as the target video processing package.

In a possible design, the processing circuitry can be configured to determine separately, in a case that the scene description information indicates that a shot object in the target shooting scene changes, target video processing packages before and after the shot object changes. Further, the processing circuitry can be configured to process separately a video obtained through shooting by using the corresponding target video processing packages before and after the shot object changes.

In an exemplary embodiment, the processing circuitry can be configured to obtain a preview video of the target shooting scene, or obtain the target video actually shot in the target shooting scene, perform image recognition on a video sequence frame of the preview video or a video sequence frame of the target video, to obtain key feature information of each frame, the key feature information being feature information of a shot object occupying the largest area and/or visually presented in the foremost location in each frame, and determine the scene description information according to key feature information of all frames.

According to a fifth aspect, a server provided having processing circuitry that can be configured to receive scene description information of a target shooting scene transmitted by a terminal device and to perform word vector representation on the scene description information, to obtain a video content feature variable The processing circuitry can also be configured to input the video content feature variable into a pre-established package recommendation model for performing package matching, to obtain a target video processing package matching the target shooting scene, the target video processing package including at least one video processing manner for processing a video in a predetermined processing mode, and to transmit the target video processing package to the terminal device or a cloud server, to enable the terminal device or the cloud server to process, according to the target video processing package, a target video obtained by shooting the target shooting scene.

In a possible design, the processing circuitry can be configured to analyze the video content feature variable, to determine an environment and/or categories and a quantity of objects corresponding to the target shooting scene, obtain through matching one video processing manner for the determined environment and/or different categories of objects separately, and use a video processing package including a plurality of video processing manners obtained through matching as the target video processing package.

In a possible design, processing circuitry can be configured to obtain user attribute information and/or historical viewing information of a user corresponding to the terminal device, and to perform word vector representation on the user attribute information and/or the historical viewing information separately, to obtain an auxiliary feature variable.

The processing circuitry can further be configured to input the video content feature variable and the auxiliary feature variable together into the package recommendation model for performing package matching, to obtain the target video processing package.

In a possible design, the processing circuitry can be configured to select a plurality of videos from videos that have been published as video training samples, and mark shooting environments and/or shot objects of the video training samples based on image recognition results of video sequence frames included in the video training samples, to obtain video content tags of the video training samples. Further, the processing circuitry can be configured to extract video processing packages used by the video training samples, and input the video content tags of the video training samples and the corresponding video processing packages as training features into a preset network model for performing training and learning, to obtain the package recommendation model.

In a possible design, the processing circuitry can be configured to determine recommendation point values of the video training samples according to historical interaction data of the video training samples, the historical interaction data of the video training samples being used for indicating interaction statuses between users and the video training samples, and perform training and learning after establishing associations between the recommendation point values of the video training samples and the corresponding video processing packages according to a predetermined association rule, to obtain the package recommendation model.

In a possible design, the processing circuitry can be configured to perform association training on the video content tags and the corresponding video processing packages in the preset network model according to a principle that a training weight of a video processing package corresponding to a larger recommendation point value is larger, to obtain the package recommendation model, or to determine target video content tags whose recommendation point values are greater than or equal to a predetermined point value, and then perform association training on the target video content tags and corresponding video processing packages in the preset network model according to a principle that a training weight of a video processing package corresponding to a larger recommendation point value is larger, to obtain the package recommendation model.

According to a sixth aspect, a server includes processing circuitry that can be configured to receive scene description information of a target shooting scene transmitted by a terminal device and a target video obtained by shooting the target shooting scene, and to receive a target video processing package transmitted by the terminal device or a modeling server, the target video processing package being a video processing package that is obtained through matching according to the scene description information and that corresponds to the target shooting scene, and the target video processing package including at least one video processing manner for processing a video in a predetermined processing mode. The processing circuitry can further be configured to process the target video according to the target video processing package.

According to a seventh aspect, a video processing apparatus is provided. The video processing apparatus can include a memory that is configured to store program instructions and a processor that is configured to invoke the program instructions stored in the memory, to perform, according to the obtained program instructions, operations included in the method according to the first aspect, operations included in the method according to the second aspect, or operations included in the method according to the third aspect.

According to an eighth aspect, a storage medium is provided, storing computer-executable instructions, the computer-executable instructions being used for causing a computer to perform operations included in the method according to the first aspect, operations included in the method according to the second aspect, or operations included in the method according to the third aspect.

According to a ninth aspect, a video processing apparatus is provided, including at least one processor and a storage medium. When instructions included in the storage medium are executed by the at least one processor, the processor may perform operations included in the method according to the first aspect, operations included in the method according to the second aspect, or operations included in the method according to the third aspect.

According to a tenth aspect, a chip system is provided. The chip system includes a processor, may further include a memory, and is configured to implement the method according to the first aspect, the method according to the second aspect, or the method according to the third aspect. The chip system may include a chip, or may include a chip and another discrete device.

It is to be understood that the above general descriptions and the following detailed descriptions are merely for exemplary and explanatory purposes, and cannot limit this disclosure.

BRIEF DESCRIPTION OF THE DRAWINGS

To describe the technical solutions in the embodiments of this application or the related art more clearly, the following briefly describes the accompanying drawings required for describing the embodiments or the related art. The accompanying drawings in the following descriptions show merely exemplary embodiments of this application, and a person of ordinary skill in the art may still derive other drawings from the accompanying drawings.

DESCRIPTION OF EMBODIMENTS

Figure 1:
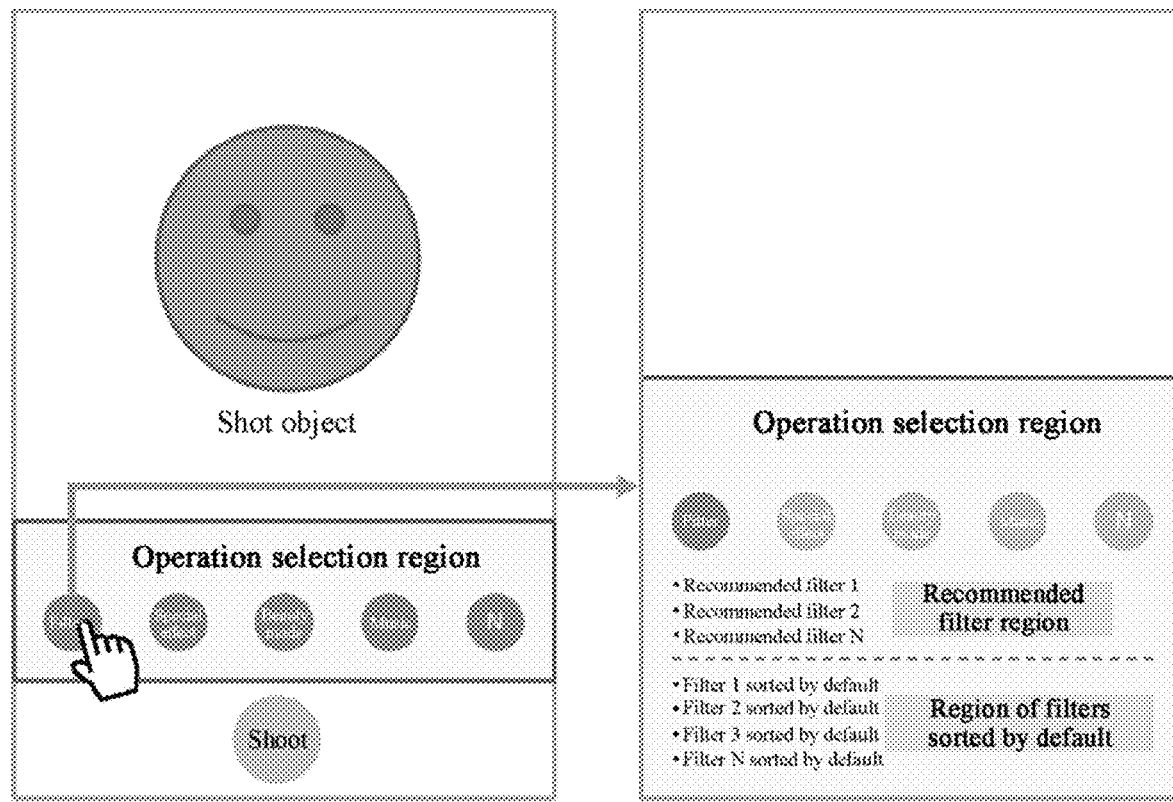
FIG. 1 is a schematic operation diagram of selecting a filter in the related art.

To make the objectives, technical solutions, and advantages of this application clearer, the following clearly and completely describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application shall fall within the protection scope of this application. In a case that no conflict occurs, the embodiments in this application and the features in the embodiments may be mutually combined in various manners. In addition, although a logical order is shown in the flowchart, in some cases, the shown or described steps may be performed in an order different from the order herein.

In the specification, claims, and accompanying drawings of this application, the terms "first" and "second" are intended to distinguish different objects but do not indicate a particular order. In addition, the terms "include" and "comprise" and any variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In the embodiments of this application, "a plurality of" may represent at least two, for example, may be two, three, or more. This is not limited in the embodiments of this application.

In addition, the term "and/or" in this specification describes only an association relationship for describing associated objects and represents that three relationships may exist. For example, A and/or B may represent the following three cases: Only A exists, both A and B exist, and only B exists. In addition, unless otherwise specially stated, the character "/" in this specification generally indicates an "or" relationship between the associated objects.

In the following, some terms included in this specification are described, to help a person skilled in the art have a better understanding.

A short video, that is, a short video clip, is a manner of spreading Internet content, is generally video content of which a duration is within 5 minutes (for example, from several seconds to several minutes) and that is spread on the Internet/the new media, and is video content that is pushed frequently and that is suitable for being viewed in a moving state and a short-time leisure state. Content of short videos covers themes such as skill sharing, child recording, makeup and beauty, humor, sports, fashion trends, pet recording, social hot spots, and delicacy recommendation.

A user may view short videos of various themes on various short video platforms. Generally, a short video platform may randomly recommend some popular short videos, or may perform specific recommendation according to a viewing preference customized by a user. For example, if a viewing preference customized by a mother user is short videos in a child recording category and a makeup and beauty category, the platform recommends short videos of the two themes to the user as many as possible during recommendation.

In practice, there can be generally two types of motivations for creating short videos: one is original, and the other is imitative. A relationship between the two types is that: after a user views an original short video that is interesting or meaningful for the user, a creation desire of the user may be stimulated, and the user may shoot a similar video by imitating the original short video. Such a video shot through imitation is referred to as an imitative video. According to valid survey data, currently, a proportion of imitative videos on various short video platforms is relatively large and is approximately 50% to 80% of a total quantity of videos.

As described above, before shooting a video, a user may select some video processing manners to perform special processing on the video, so that a satisfactory video effect may be obtained. For example, when viewing a short video about a baby that is published by another person, a user feels that actions and music in the video are all interesting, and wants to imitate this effect and publish a short video himself or herself. Then, the user opens a short video APP and prepares to shoot his or her baby. Before tapping a shoot key, the user may select a filter, a special effect, a beauty mode, music, and other effects that are needed in an operation selection region shown in FIG. 1. Using an example of selecting a filter, after the user taps a filter key (shown in the left part of FIG. 1), the operation selection region may pop up more filters (shown in the right part of FIG. 1) for a user to select. The filters are mainly classified into two parts, namely, a recommended filter region and a region of filters sorted by default. Filters in the recommended filter region are arranged, for example, in descending order of usage frequencies of the filters in the short video APP, or are arranged in descending order of usage frequencies of the filters used by the user in previous video shooting. Filters in the region of filters sorted by default are randomly arranged, for example, arranged according to a default system ranking of the short video APP. The user may select one currently needed filter effect from the recommended filter region or the region of filters sorted by default, thereby completing a selection of a filter. Selections of the special effect, the beauty mode, the music, and other effects are all similar to the selection of the filter. It can be seen that the whole selection process requires the user to perform a relatively large quantity of operation steps, and is relatively cumbersome. Particularly, when a filter, a special effect, a beauty mode, music, and other effects need to be selected sequentially, a longer time needs to be consumed.

In a specific practice process, the applicant of this application finds that currently, in a process of selecting video processing manners before a video is shot, a user needs to perform a relatively large quantity of operations and spend a relatively long time to complete selections. The whole process is completed completely based on manual operations of the user and is time-consuming, and matching efficiency of selecting the video processing manners is relatively low. Therefore, the applicant considers that, the video processing manners may be obtained through matching for the user by using a capability of a terminal device, that is, the terminal device automatically recommends video processing manners for the user. In this way, the user does not need to manually make selections, and operations of the user can be reduced. In addition, video processing packages including a plurality of video processing manners may be directly obtained through matching. For example, video processing packages including a filter, a beauty mode, a special effect, and music may be simultaneously obtained through matching. Compared with a manner in which the user sequentially select the video processing manners one by one, efficiency may be improved.

To implement accurate recommendation based on automatic recommendation of the terminal device, the applicant further explores features of existing short videos, and finds that most short videos start with an imitation motivation. The so-called imitation is imitating a scene, a character, and an action in a published video to implement a similar video effect. That is, content of a to-be-shot video is roughly the same as that of an imitated video. The same video content means that an environment of a shooting scene and categories and a quantity of objects are roughly the same. In other words, environments of shooting scenes and shot objects in the shooting scenes are roughly the same, and actions of the shot objects are also substantially the same. The so-called shot object herein may be a person, an animal, or another static object, for example, a baby, a baby and a mother, a cat, a mobile phone, or a plant. Based on the findings, the applicant considers to match a corresponding video processing package according to scene description information of a shooting scene. The scene description information can be used for describing a general environment of the shooting scene and a related situation of the shot object. Therefore, a matching result obtained by implementing automatic matching of the video processing package by using the scene description information can accord with, as much as possible, current video content that is actually shot, to satisfy an actual shooting requirement of the user to a specific extent, so that the video that is finally obtained through processing can satisfy a requirement of the user. In addition, to enable the video shot through imitation to be popular with most people, and because the video is shot through imitation, indicating that the user likes an entire video effect of the imitated video, some video processing effects of the imitated video may be directly used during the imitative shooting. That is, current video processing manners that are actually needed may be determined according to the video processing effects of the published video, which is to be described below in detail. For an original video, a similar shooting scene may also be found according to the scene description information for performing matching. Therefore, the original video is regarded as an imitative video to match a corresponding video processing package, and the foregoing principle is also applicable.

According to the foregoing analysis, on the premise that matching efficiency of video processing manners in the related art is relatively low, an embodiment of this application provides a video processing method, to improve the matching efficiency and accuracy of the video processing manners. In the method, scene description information of a target shooting scene needs to be first obtained, and then a target video processing package corresponding to the target shooting scene is automatically obtained through matching based on the scene description information. In this way, an operation of manually making a selection by a user is omitted, and the matching efficiency may be improved to a specific extent. In addition, because the target video processing package is correspondingly obtained through matching based on the scene description information, pertinency and accuracy of the matching may be improved to a specific extent, to make a matching result accord with, as much as possible, a current video that is actually shot, thereby satisfying an actual requirement of the user. The target video processing package includes at least one video processing manner for processing a video in a predetermined processing mode. For example, the target video processing package includes a plurality of video processing manners, that is, a filter is "little forest", a beauty degree is level 3, a degree of magnifying eyes and sliming a face is level 2, a special effect is "bubbles", and music is "Guaiwawa". Then, a target video obtained by shooting the target shooting scene is processed by using the obtained target video processing package, to obtain a processed target video. Using a filter as an example, before the target video is processed by using the target video processing package, the target video has no filter effect. However, after the processing, the target video has a filter effect, so that the target video obtained through shooting can implement a plurality of video effects according to the target video processing package automatically recommended by the terminal device.

The following briefly describes application scenarios to which the technical solutions of the embodiments of this application can be applied. The application scenarios described below are merely intended for describing the embodiments of this application, but not for limiting this application. During specific implementation, the technical solutions provided in the embodiments of this application may be flexibly applied according to an actual requirement.

Figure 2A:
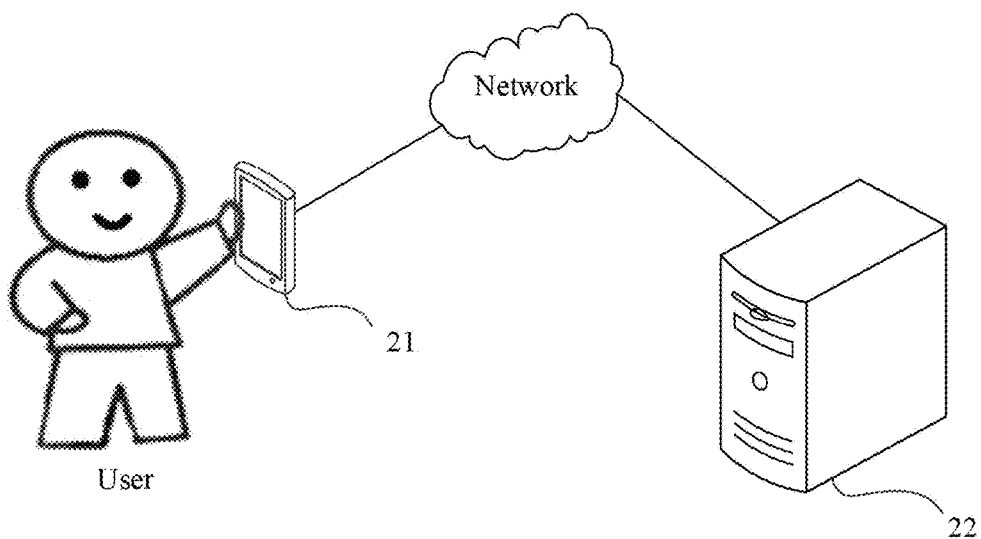
FIG. 2A is a schematic diagram of an application scenario of a video processing method according to an embodiment of this application.

FIG. 2A shows an application scenario to which a video processing method can be applied according to an embodiment of this application. The application scenario includes a terminal device 21 and a server 22. An APP that can shoot a video may be installed in the terminal device 21. For ease of description, in this embodiment of this application, an APP having a video shooting function is referred to as a video APP. In other words, a client of a video APP, such as TikTok, Meipai, or Weishi, is installed and run in the terminal device 21. The server 22 refers to a server corresponding to the client of the video APP, for example, an application server. The application server may provide a corresponding installation package and update package for installing and updating the video APP. During a running process of the video APP, the client of the video APP may interact with the corresponding application server. In the application scenario shown in FIG. 2A, a user may use the terminal device 21 to shoot a target shooting scene by using a built-in camera (a front-facing camera or a rear-facing camera), to obtain scene description information of the target shooting scene, and further match a target video processing package corresponding to the target shooting scene according to the obtained scene description information.

The client of the video APP in the terminal device 21 may independently perform the matching process. Alternatively, the terminal device 21 may report the obtained scene description information to the server 22, to match the target video processing package by using the server 22. That is, the server 22 (the application server) performs the matching. Before, after, and even when the target video processing package is obtained through matching, the terminal device 21 may further shoot the target shooting scene to obtain a target video, and finally process the target video obtained through shooting by using the target video processing package obtained through matching, thereby obtaining a processed target video. The process of processing the target video by using the target video processing package may be performed by the terminal device 21, or may be performed by the server 22. If the terminal device 21 performs the process, after processing the target video, the terminal device 21 may transmit the processed target video to the server 22 through the client of the video APP, and finally the server 22 publishes the processed target video. Before the publishing, the server 22 may further review the video. If video content that cannot be spread on a network is included, the publishing is prohibited.

Figure 2B:
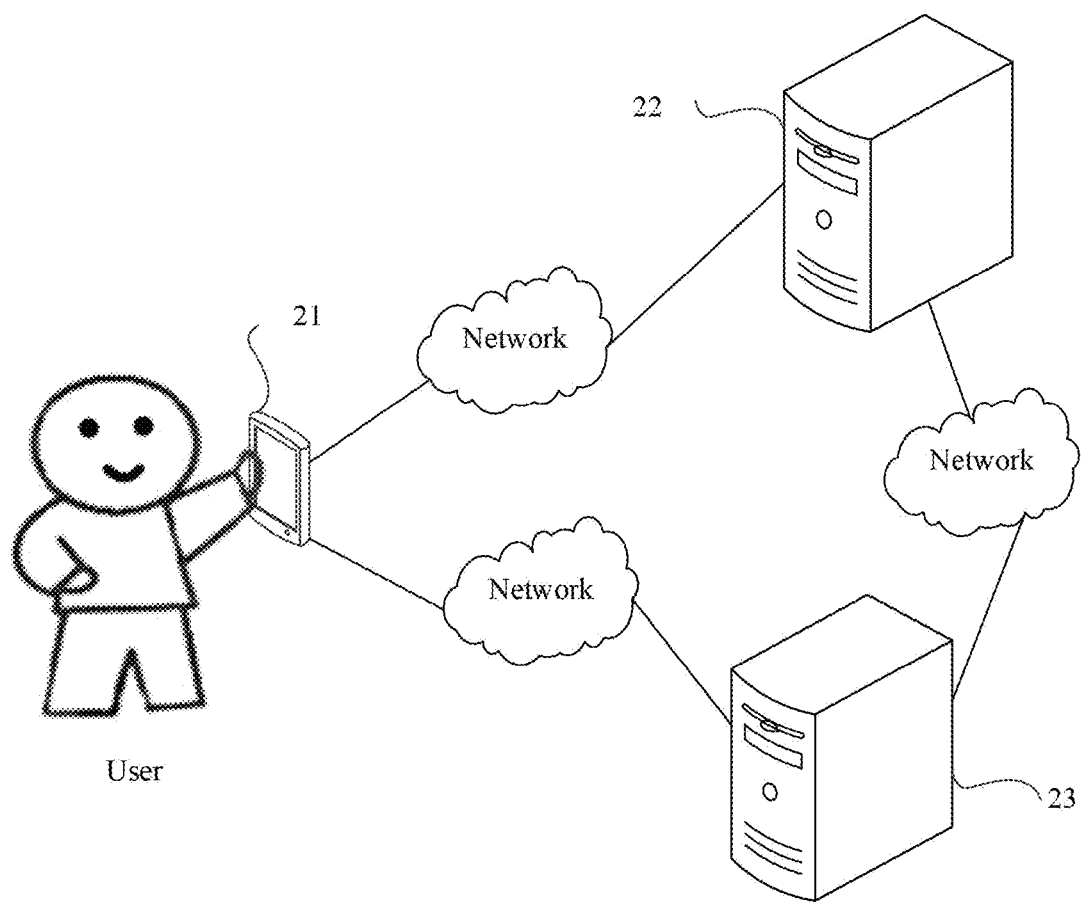
FIG. 2B is a schematic diagram of another application scenario of a video processing method according to an embodiment of this application.

FIG. 2B shows another application scenario to which a video processing method can be applied according to an embodiment of this application. The application scenario includes a terminal device 21, a server 22, and a server 23. The terminal device 21 and the server 22 are the same as those in FIG. 2A. The server 23 may be a cloud server, configured to process a target video according to a target video processing package. In practice, the cloud server and the server 22 may be one server, or may be different servers that are separate as shown in FIG. 2B. When the server 23 and the server 22 are different servers, after processing the target video, the server 23 may transmit the processed target video to the server 22, so that the server 22 (that is, the application server) reviews and publishes the target video. Alternatively, the server 22 may directly publish the target video. In a case that the server 23 publishes the target video, the server 22 and the server 23 may pre-establish a related protocol that allows the server 23 to publish the video, to prevent the server 23 from causing negative impact because of illegal publishing.

Figure 2C:
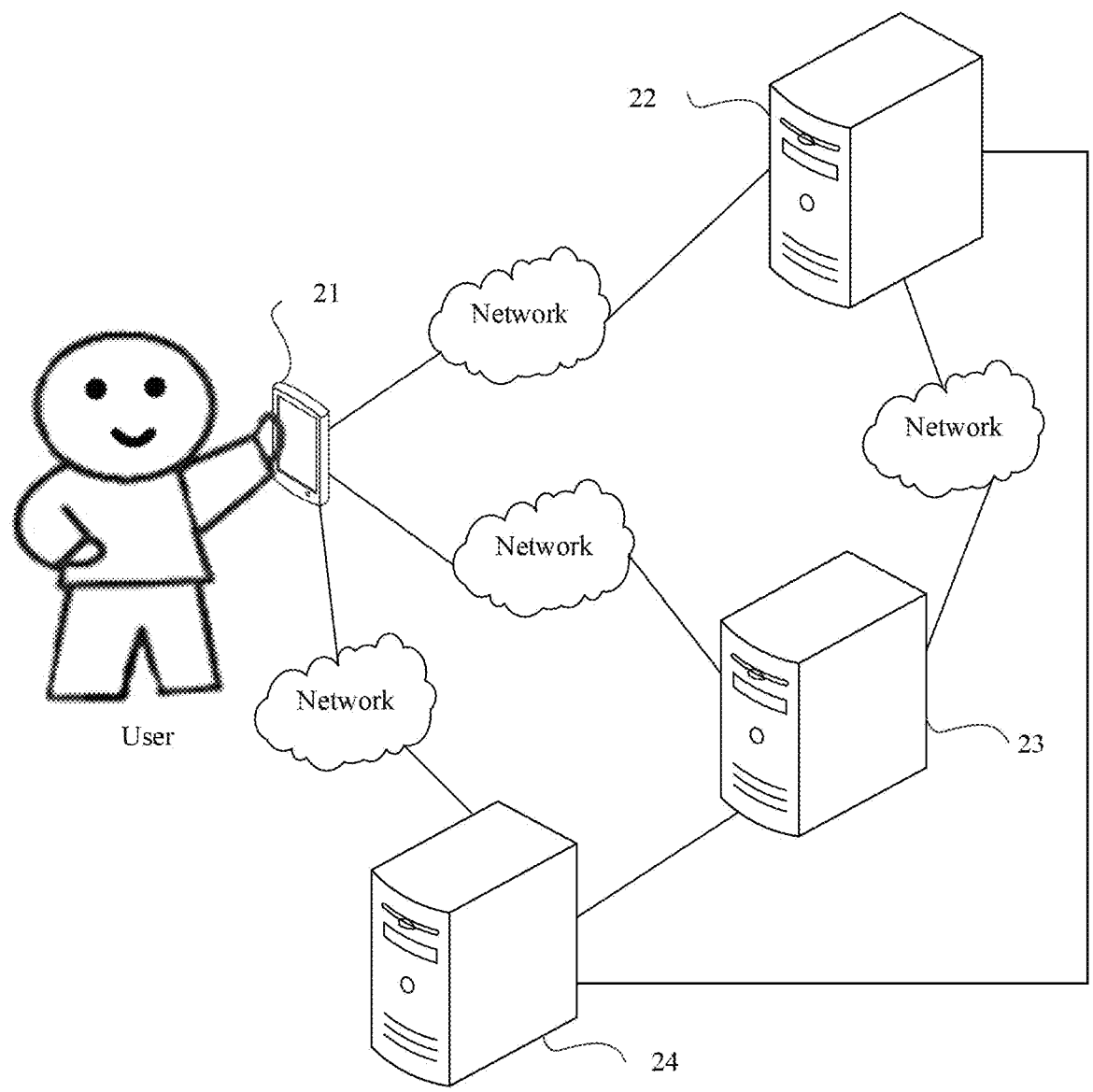
FIG. 2C is a schematic diagram of another application scenario of a video processing method according to an embodiment of this application.

FIG. 2C shows another application scenario to which a video processing method can be applied according to an embodiment of this application. The application scenario includes a terminal device 21, a server 22, a server 23, and a server 24. Related descriptions of the terminal device 21, the server 22, and the server 23 have been provided above. The server 24 refers to a modeling server configured to establish a package recommendation model. That is, the server 24 may establish the package recommendation model, and may transmit the established package recommendation model to the terminal device 21, the server 22, and the server 23, to enable the terminal device 21, the server 22, and the server 23 to match a target video processing package by using the package recommendation model and scene description information. Alternatively, after receiving scene description information transmitted by the terminal device 21, the server 24 may directly match a target video processing package based on the scene description information and the established package recommendation model. In a specific implementation process, according to different ones that match a target video processing package by using the package recommendation model and the scene description information, a communication connection may be selectively established between the server 24 and the terminal device 21 or a different server. In FIG. 2C, an example in which communication connections between the server 24 and all of the terminal device 21, the server 22 and the server 23 are established is used for illustrative description.

The foregoing examples describe some possible application scenarios. In some other application scenarios, for example, an application scenario including only the terminal device 21, the server 22, and the server 24, in a specific implementation process, different application scenarios may be selected according to an actual network deployment to implement the technical solutions in the embodiments of this application. In general, operations of obtaining scene description information of a target shooting scene and obtaining a target video by shooting the target shooting scene are performed by the terminal device 21, an operation of matching a target video processing package according to the scene description information may be performed by the terminal device 21, the server 22 (the application server), the server 23 (the cloud server), or the server 24 (the modeling server), and an operation of processing the target video according to the target video processing package may be performed by the terminal device 21, the server 22 (the application server), or the server 23 (the cloud server). In addition, in some possible network architectures, the server 22 (the application server), the server 23 (the cloud server), and the server 24 (the modeling server) may be three servers that exist separately. Alternatively, any two of the servers or the three servers may be deployed as one server.

The terminal device 21 may be a mobile phone, a tablet computer, a palmtop computer (such as a personal digital assistant (PDA)), a notebook computer, an in-vehicle device, a smart wearable device (for example, a smartwatch and a smart bracelet), a personal computer, or the like. Any one of the devices can run the video APP, that is, can run the client of the video APP. The server 22, the server 23, and the server 24 may all be personal computers, large/medium-scale computers, computer clusters, or the like.

To further describe the technical solutions provided in the embodiments of this application, the following describes the technical solutions in detail with reference to the accompanying drawings and specific implementations. Although the embodiments of this application provide method operation steps as described in the following embodiments or the accompanying drawings, more or fewer operation steps may be included in the method based on conventional means or without creative efforts. In the steps in which no necessary causal relationship logically exists, the execution order of the steps is not limited to the execution orders provided in the embodiments of this application. When the method is performed in a video processing process or in an apparatus in practice, sequential execution or parallel execution may be performed according to the method orders shown in the embodiments or the accompany drawings (for example, in a parallel processor or multi-thread processing application environment).

Figure 3:
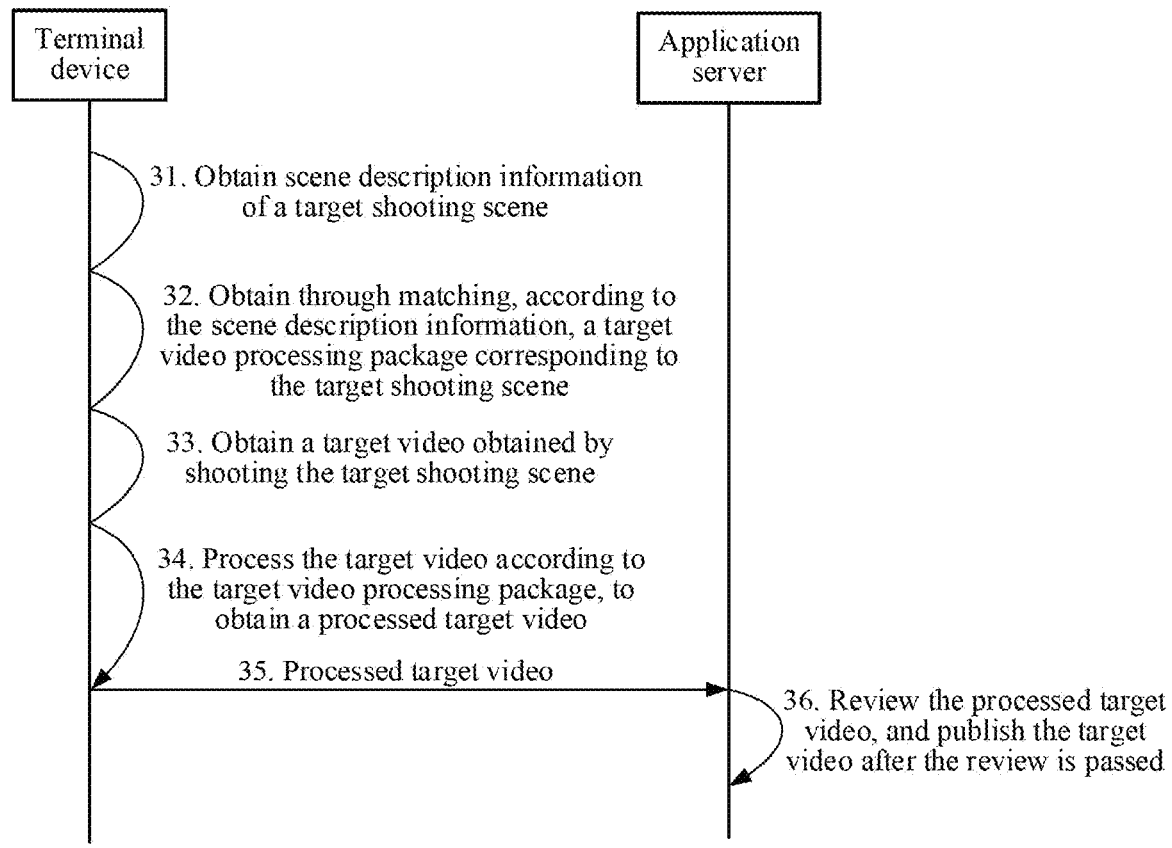
FIG. 3 is a flowchart of a video processing method according to an embodiment of this application.

FIG. 3 is a flowchart of a video processing method according to an embodiment of this application. A procedure of the method is described as follows:

In step 31, a terminal device obtains scene description information of a target shooting scene. A shooting scene refers to a scene that is targeted when a video is shot. For example, when a baby who is learning to walk in a living room is shot, an image formed by an environment, that is, the living room, and all objects (for example, the baby and a sofa) included in the living room may be understood as the shooting scene. In other words, the shooting scene may be understood as a set of an environment that is targeted when a video is shot and all shot objects included in the environment. The target shooting scene may refer to a name of a specific scene. For example, a shooting scene that is finally shot in a video is referred to as the target shooting scene.

In a video shooting process, the shooting scene may change. For example, for a 15-second short video, a baby that is learning to walk in a living room is shot in first 8 seconds, and an image in which a mother holds the hands of the baby to learn to walk in a kitchen is shot in the last 7 seconds. In practice, whether the shooting scene is switched may be determined according to whether a shot image changes by a predetermined degree. The foregoing example continues to be described. When the shot image changes from an image in which the baby is learning to walk in the living room to the image in which the mother holds the hands of the baby to learn to walk in the kitchen, because a background (which changes from the living room to the kitchen) and a shot object (which changes from the baby to the baby and the mother) both substantially change, it may be considered that the shooting scene changes. If the shot image changes from an image in which the baby learns to walk by holding one side of an edge of a sofa in the living room changes into an image in which the baby learns to walk by holding another side of the edge of the sofa, because only a few changes of the environment occur, in this case, it may be considered that the scene is not switched.

In this embodiment of this application, the scene description information refers to information used for describing a related situation of the shooting scene. Specifically, the scene description information refers to feature description information for describing an environment of the shooting scene and/or features of a shot object in the shooting scene. For ease of description, the environment of the shooting scene may be referred to as, for example, a shooting environment. For example, feature description information of the shooting environment may include, for example, all information that can be used for describing the current shooting environment such as a shooting time, a shooting geographical location, device information (for example, an brand model mobile phone) of a shooting device used during the shooting, and shooting parameter information. However, feature description information of the shot object is all attribute information that can depict a current actual state of the shot object. For example, the feature description information of the shot object is all attribute information that can objectively describe the shot object, for example, a species, a height, a skin color, a hair color (for example, the shot object is a white cat), an expression, and an action of the shot object.

For example, for a shooting scene in which a baby is in a living room, scene description information of the shooting scene may include light intensity of the living room, a shooting time, a general color of a background wall of the living room (for example, a white wall), a general shape and a general size of the living room (for example, the living room is a rectangle that is 3 meters long and 2 meters wide), categories of objects included in the living room, and a main feature of each object (for example, a blue sofa and a white tea table are included), an approximate height (for example, 90 centimeters) and a skin color of the baby, a general action (for example, standing, sitting, or lying on the back) of the baby, a hair style (for example, a bald head, short hair, or two little pigtails) of the baby, a clothes style of the baby, and whether the baby holds an object in his/her hand.

In another example, for a shooting scene in which a shooting theme is scenery, scene description information of the shooting scene may include light intensity of an environment, a current weather situation (for example, snowy, rainy, or sunny), a shooting time, a shooting location (for example, a scenic spot), a shot object (for example, a forest, a waterfall, or a rushing river) accounting for a large proportion of the shooting scene, and a general shape and color of the shot object.

In another example, for a shooting scene in which a shooting theme is a piece of cake, scene description information of the shooting scene may include a shape, a color, and a quantity of layers of the cake, a shape and a color of a carrying surface for placing the cake (for example, a tabletop or a fruit tray dedicated for placing the cake), light intensity of the current environment, and the like.

In still another example, for a shooting scene in which a shooting theme is a singer who is singing a song, scene description information of the shooting scene may include light intensity and sound intensity of an environment, a shooting time, a shooting location, a music style of the song that is sung, a speed at which the singer sings the song, a skin color, a hair style, and fashion styling of the singer, an action of the singer, and the like.

The scene description information in this application is explained and described by using several specific shooting scenes listed above. In general, by using the scene description information, not only an environment of the shooting scene may be determined, but also all shot objects in the shooting scene, specific features of the shot objects, and the like may be determined. The shot object may be dynamic or static. A dynamic shot object may include, for example, a person or an animal such as a baby, a mother, and a cat. A static shot object is, for example, a mobile phone or a pot of green plants. It may be seen that, by using the scene description information, composition of a general environment and a shot object of the target shooting scene may be known.

Feature description information of different types included in the scene description information in this embodiment of this application may be obtained in different manners. The feature description information of different types described herein includes at least feature description information of the shooting environment and feature description information of the shot object. For ease of understanding, an example is used for description in the following.

(1) Feature Description Information of the Shooting Environment

In a process of obtaining a preview video of the target shooting scene or formally shooting a video, a shooting device may obtain a shooting time and a shooting geographical location in real time. For example, the video is shot at 16:32 in a specific scenic spot on Jun. 6, 2018. By using the shooting time and the shooting geographical location, a situation of the current target shooting scene may be generally learned of in time and space.

The shooting time and the shooting geographical location may be uploaded to a backend or a cloud, so that a current actual weather situation may be determined by searching on a network. For example, determined weather is "sunny with a temperature of 28° C. to 33° C. In other words, related feature description information of the target shooting scene may be obtained online by using some objective information detected by the shooting device in combination with network searching. Alternatively, a matching search may be directly performed by using the shooting time and the shooting geographical location in videos that have been published (including videos that are being reviewed and are being published) in a system, so that the current actual weather situation may be determined by using a weather corresponding to videos matching the shooting time (for example, an interval between shooting times is within 10 minutes) and the shooting geographical location (for example, a distance between shooting geographical locations is within 2 kilometers). In other words, the current actual weather situation may be determined by using a video platform system, and direct interaction between a plurality of users may be facilitated by using a sharing mechanism in which video data is shared to the public.

In addition, a manner of determining the weather may alternatively be directly obtained without network searching. For example, the shooting device may detect a current temperature, humidity, light intensity by using a built-in sensor, and further approximately determine the current actual weather situation by using the parameter values.

Moreover, for device information and shooting parameter information of the shooting device, using an example in which the shooting device is a mobile phone, that mobile phones of different models of different brands may have different shooting capabilities, and that shooting parameters that are set by users when the users perform shooting by using the shooting device may also be different are mainly considered. Because of possible existence of the differences, scene description information of different target shooting scenes may also be different. By considering the differences, determining of the scene description information may be more accurate, so that a matching attribute is better when the target video processing package is determined subsequently.

(2) Feature Description Information of the Shot Object

The shot object actually exists in the target shooting scene. Therefore, the feature description information of the shot object is objective and actual information. For this type of feature description information, image recognition and image feature extraction may be directly performed on a preview video of the target shooting scene obtained through shooting or video frames of a formally shot video, to obtain feature description information of shot objects in an image processing manner.

In a specific implementation process, the preview video of the target shooting scene may be obtained by using a camera of the terminal device before shooting of a video formally starts, and then the scene description information is obtained by using the preview video. Alternatively, the scene description information may be obtained according to an actually shot target video in a process of formally shooting the video. Specifically, image recognition may be performed on a video sequence frame of the preview video or a video sequence frame of the target video, to further obtain key feature information of frames of images, and finally, the scene description information is determined according to the key feature information of all the frames. In other words, before a video is formally shot, the scene description information may be obtained by using the preview video. Alternatively, the scene description information may be obtained by using a video that has been obtained through shooting after or when the video is formally shot. It may be seen that, a determining moment of the scene description information may not be particularly required in this embodiment of this application.

For a manner in which the scene description information is obtained before a video is formally shot, a target video processing package may be determined in advance according to the scene description information, so that in the process of shooting the video, each frame of image or a plurality of consecutive frames of images that is or are obtained may be processed in real time by using the target video processing package. Therefore, a processed video may be naturally obtained after shooting of the video is finished. In this way, shooting and processing of the video may be performed as synchronously as possible, so that timeliness of video processing may be ensured, and efficiency of the video processing may be improved.

For a manner in which the scene description information is obtained after shooting of a video starts, frames of video images in the video may be processed in a unified manner by using the target video processing package after the shooting of the video is finished. Alternatively, once the scene description information is determined and after a target video processing package is determined according to the scene description information, a video that has been shot may be processed timely, and each frame of image or a plurality of consecutive frames of images of a video that is subsequently shot is or are processed in real time. In this manner, because the scene description information is determined according to the actually shot video, the obtained scene description information may represent a current scene that is actually shot to the largest extent, and has higher accuracy. In this way, a case that the scene description information is not updated timely because of a scene change may be avoided, thereby improving accuracy of determining the target video processing package, so that the finally determined target video processing package may accord with, as much as possible, the current scene that is actually shot, to improve effectiveness and accuracy of video processing, and satisfy an actual requirement of a user.

In this embodiment of this application, two optional manners are provided according to different obtaining moments of the scene description information, to improve diversity of the solution in this embodiment of this application, so that the solution in this embodiment of this application can be applied to different application scenarios, thereby further improving applicability of this solution.

Figure 4:
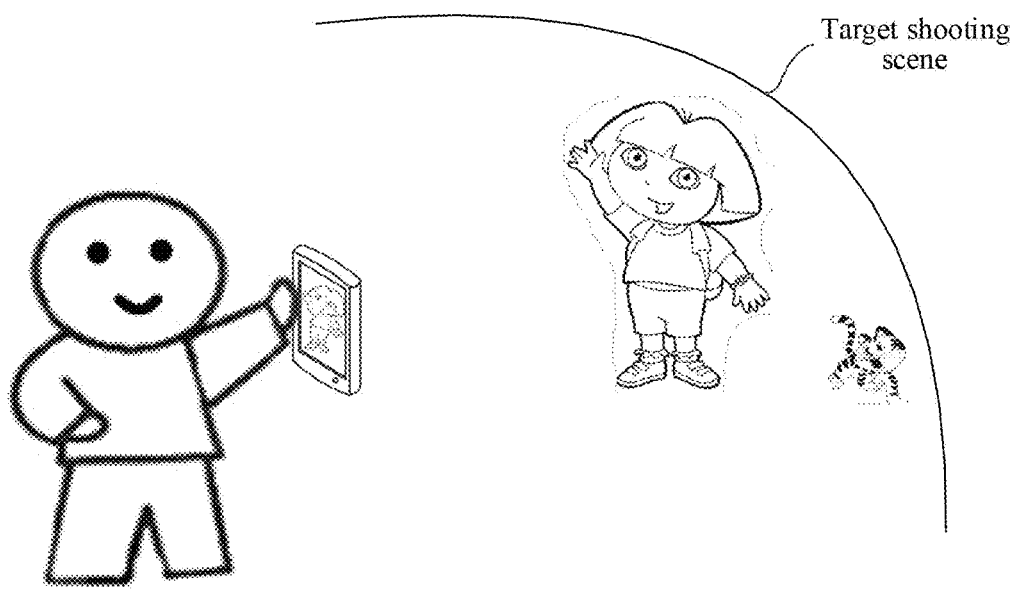
FIG. 4 is a schematic diagram of a user shooting a video of a target shooting scene by using a terminal device according to an embodiment of this application.

In addition, the key feature information in this embodiment of this application is feature information of a shot object that has the largest area and/or visually presented at the foremost location in each frame of video image. For example, referring to FIG. 4, in this case, a user is shooting a video for a kid in front of the user by using a mobile phone. A target shooting scene in which the kid exists further includes a cat located right back to the kid. In the entire target shooting scene, the kid occupies the largest area and is also located at a location, in the scene, of which a distance from the user who is shooting is the shortest. Therefore, in this case, the kid may be regarded as a key shot object, or referred to as a main shot object, in the target shooting scene. Therefore, feature information of the kid may be determined as key feature information of the target shooting scene. Because the cat is farther from a camera, the cat is not considered. It may be determined that a kid exists in the target shooting scene according to feature information of the kid, and the kid is in a state of standing at attention. Therefore, key feature information of the target shooting scene may be determined as "a kid that stands at attention". Finally, the key feature information may be directly used as the scene description information. Therefore, by using the scene description information, it may be learned that a kid that is in a state of standing at attention exists in the target shooting scene.

In step 32, the terminal device obtains through matching, according to the scene description information, a target video processing package corresponding to the target shooting scene, the target video processing package including at least one video processing manner for processing a video in a predetermined processing mode.

After obtaining the scene description information, the terminal device may match a target video processing package corresponding to the target shooting scene according to a preset package recommendation policy. The target video processing package in this embodiment of this application is simply understood as a set of at least one video processing manner. A video may be processed by using the at least one video processing manner in a predetermined processing mode, and a corresponding video processing effect may be obtained after the processing. For example, the target video processing package includes a plurality of video processing manners, that is, a filter is "little forest", a beauty degree is level 3, a degree of magnifying eyes and sliming a face is level 2, a special effect is "bubbles", and music is "Guaiwawa". Then, a target video obtained by shooting the target shooting scene is processed by using the obtained target video processing package, to obtain a processed target video. Using a filter as an example, before the target video is processed by using the target video processing package, the target video has no filter effect. However, after the processing, the target video has a filter effect, so that the target video obtained through shooting can implement a plurality of video effects according to the target video processing package automatically recommended by the terminal device.

Figure 5:
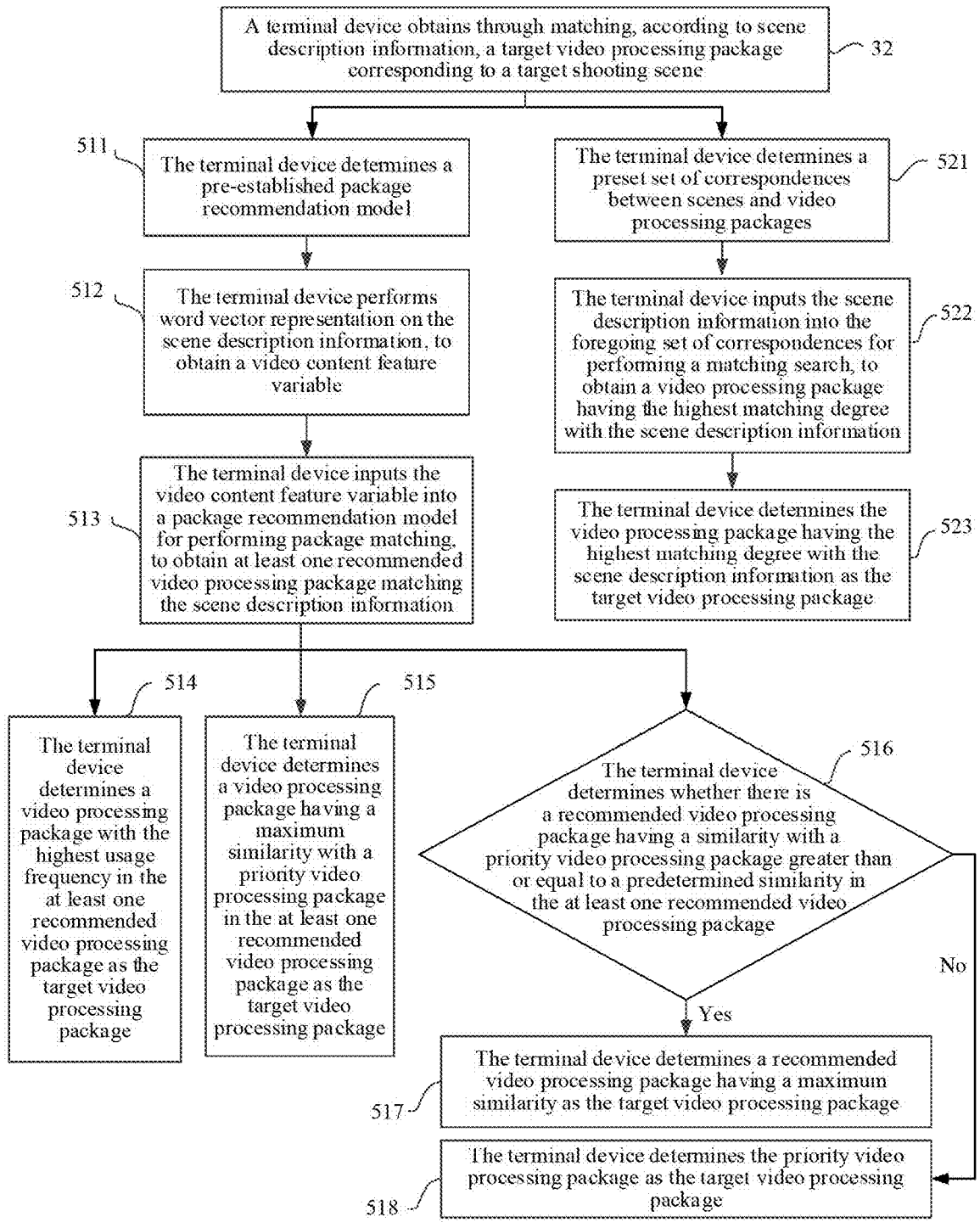
FIG. 5 is another flowchart of a video processing method according to an embodiment of this application.

To describe the solution in this embodiment of this application, the following describes a manner of determining a target video processing package in this embodiment of this application with reference to FIG. 5.

First Manner:

In the first manner, a target video processing package is determined with reference to a pre-established package recommendation model, and a specific procedure is shown in step 511 to step 518 in FIG. 5, and is described in detail as follows:

In step 511, the terminal device determines a pre-established package recommendation model. The pre-established package recommendation model refers to a data model that is established in advance and that is used for recommending a video processing package. The package recommendation model may be a model established by performing deep learning according to video content of a large quantity of videos that have been published. The package recommendation model may be established by an application server corresponding to a video APP, or may be established by a dedicated modeling server. Regardless of an establishment manner, the established package recommendation model may be embedded into a client of the video APP and used as an embedded function of the video APP. Therefore, after the client of the video APP is installed in the terminal device, the terminal device may obtain the package recommendation model.

The package recommendation model in this embodiment of this application may be a model obtained by performing, by using a multitasking network model, deep learning on a plurality of videos that have been published. Therefore, when the target video processing package is determined according to the scene description information and the package recommendation model, reference may be made, as much as possible, to video processing packages used by the videos that have been published. In this way, the determined target video processing package can accord with usage habits and hobbies of common people as much as possible, so that the processed target video can be popular with the common people.

Figure 6:
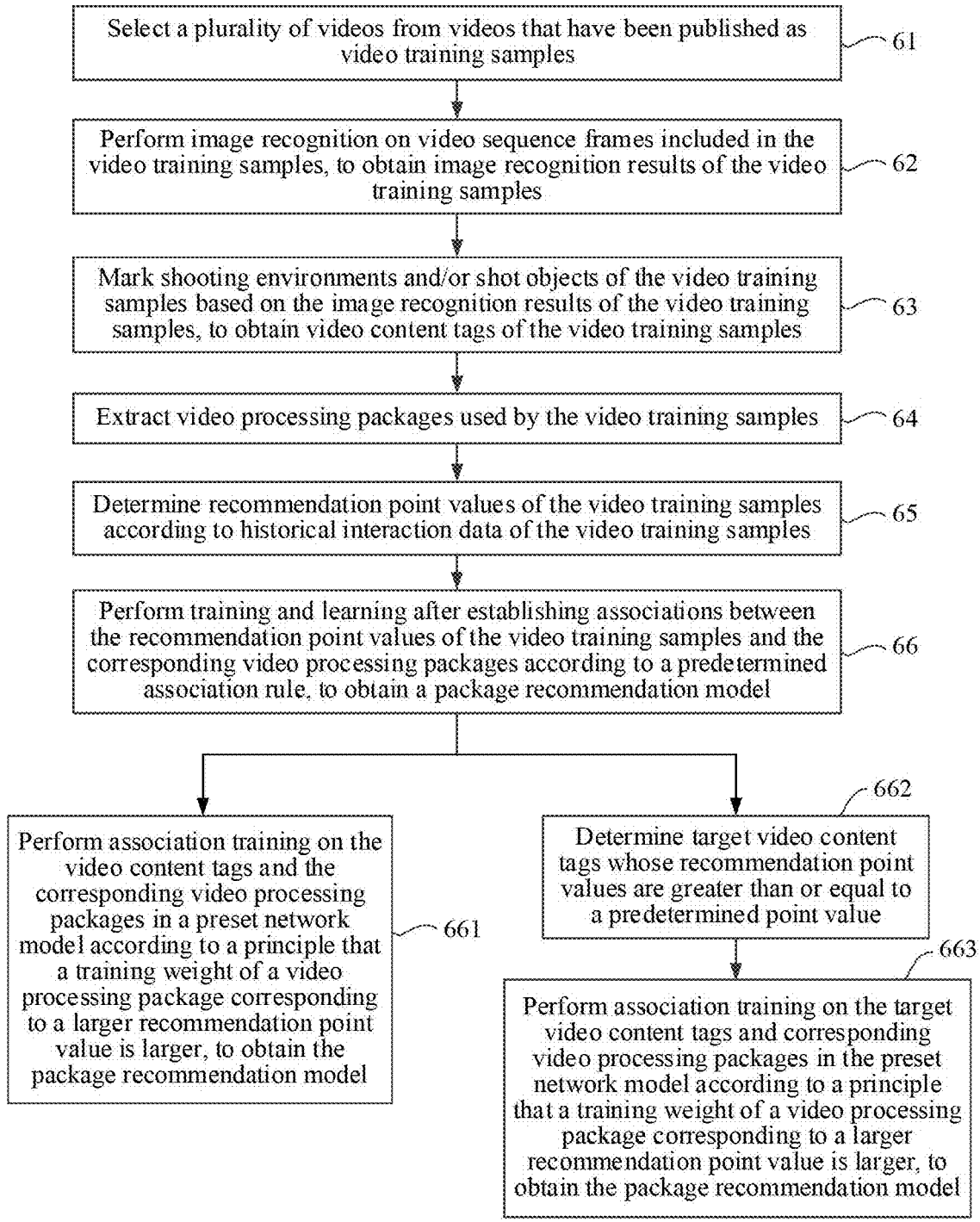
FIG. 6 is another flowchart of a video processing method according to an embodiment of this application.

In a specific implementation process, the package recommendation model may be established according to the method shown in FIG. 6. Optionally, the package recommendation model may be established by using the terminal device, a modeling server, or a cloud server.

In step 61, a plurality of videos can be selected from videos that have been published as video training samples. When the video training samples are determined, a video resource is not particularly limited. For example, all the video training samples are from the same video APP, or may be from different video APPs. In addition, to ensure accuracy and applicability of the package recommendation model obtained through learning, the video training samples may include massive videos that have been published, for example, a hundred thousand short videos. Moreover, to enable the established package recommendation model to perform package recommendation for different video content as much as possible, it would be better to select videos of various themes during selection of the video training samples, and to enable the established package recommendation model to cover video processing packages used by users within a recent time period, videos within the recent time period (for example, within a week) may be selected as the video training samples.

In step 62, image recognition can be performed on video sequence frames included in the video training samples, to obtain image recognition results of the video training samples. The image recognition described herein is mainly performing recognition on basic features, such as a color feature and a shape feature, included in each frame of image.

Step 63. Mark shooting environments and/or shot objects of the video training samples based on the image recognition results of the video training samples, to obtain video content tags of the video training samples.

Similarities and deviations between frames of images in terms of the color feature, the shape feature, and another feature may be determined according to the image recognition results of the video training samples. Then, shooting environments and/or shot objects of the video training samples are determined by using a specific data processing method. For example, for one of the video training samples, a shooting environment of the video training sample is determined as a lawn under the sun, and determined shot objects are a kid and a middle-aged woman. The determined shooting environments and the shot objects may be marked, and video content tags of the video training samples may be obtained according to the marking. The foregoing example continues to be described. For the video training sample, obtained video content tags are "a lawn in a sunny day" and "a kid and a middle-aged woman".

In step 64, video processing packages used by the video training samples can be extracted. Because all the video training samples are videos that have been published by users on the network, the users generally process the videos before the publishing. In other words, the video training samples are obtained by adding some video effects into original videos. Therefore, each of the video training samples may be analyzed, to further determine video processing manners used for video effects corresponding to the video training sample. Then, a set of the video processing manners used by the video training sample is determined as a video processing package corresponding to the video training sample.

After the video content tags of the video training samples and the corresponding video processing packages are obtained, the video content tags of the video training samples and the corresponding video processing packages may be used as training features and inputted into a preset network model for performing training and learning, to obtain the package recommendation model in this embodiment of this application according to a final training and learning result. In a specific implementation process, a model may be established by using an existing learning model. For example, training and learning are performed on the video content tags and the corresponding video processing packages by using a logistic regression method, a decision tree, or another preset network model. A preset network model specifically used is not limited in this embodiment of this application.

In step 65, recommendation point values of the video training samples can be determined according to historical interaction data of the video training samples.

In step 66, training and learning can be performed after establishing associations between the recommendation point values of the video training samples and the corresponding video processing packages according to a predetermined association rule, to obtain the package recommendation model. Different video training samples have different popularities. The popularity described herein is a degree to which a video is popular with users. For example, in this embodiment of this application, historical interaction data of a video may be used for representing a degree to which the video is popular. The historical interaction data may be used for indicating interaction statuses between all users and the video training sample. For example, a viewing behavior and a social behavior of a user may be viewing data and social data of a video in a corresponding video training sample. Viewing data of a video may include all pieces of data related to viewing of users, such as a total quantity of users that view the video, a total quantity of times that the video is viewed, and a total time length of each view. Social data of a video may include all pieces of data related to social behaviors of users such as a like count, a forward count, a comment count, and a download count.

Recommendation point values of the video training samples may be calculated according to the historical interaction data of the video training samples. The recommendation point values are equivalent to popularities of the video training samples. A larger recommendation point value indicates a higher popularity, and a larger degree to which users like the video training sample. Because there are a relatively large quantity of users that like the video training sample, it indicates that the entire video effect of the video training sample can also be approved and liked by most people. Therefore, different corresponding training weights may be set for video training samples with different recommendation point values, to highlight, as much as possible, video training samples with relatively high popularities, so that the package recommendation model obtained through training can accord with a common requirement, and applicability and universality of the model are improved.

For example, the recommendation point value may be calculated in the following manner: (1) for the viewing data, it is assumed that 1 point is added if a viewing time is greater than 10 seconds, 1 point is added for one view, and 1 point is added if a viewing count of the same user is greater than a predetermined count (for example, 3 counts); and (2) for the social data, it is assumed that 1 point is added if the video is liked once, 1 point is added if the video is forwarded once, 1 point is added if the video is commented once, and 2 points are added if a count of words of one comment is greater than a predetermined count of words (for example, 30 words). Then, the viewing data and the social data are respectively obtained and are added up, so that the finally recommendation point value may be obtained.

For a specific implementation of step 66, any one of the following two manners may be used according to an actual usage requirement in a specific implementation process.

Manner 1:

In step 661, association training can be performed on the video content tags and the corresponding video processing packages in the preset network model according to a principle that a training weight of a video processing package corresponding to a larger recommendation point value is larger, to obtain the package recommendation model.

In other words, one corresponding recommendation point value may be obtained for each video training sample, and then, association training is then performed on the video content tags and the corresponding video processing packages in the preset network model according to a principle that a training weight corresponding to a larger recommendation point value is larger. Because a larger recommendation point value indicates that a video training sample is more popular with common users, if training is performed on the video training sample by using a larger training weight, the video training sample may be more prominent. Therefore, a video processing package corresponding to such a video training sample may also be added to a recommendation pool of the package recommendation model, to facilitate recommending, as preferentially as possible, the video processing package to the user in a subsequent process of performing recommendation by using the package recommendation model. In addition, all the video training samples are inputted into the preset network model for training. In this way, the samples may be comprehensive as much as possible, thereby improving universality of the package recommendation model.

Manner 2:

In step 662, target video content tags can be determined whose recommendation point values are greater than or equal to a predetermined point value.

In step 663, association training can be performed on the target video content tags and corresponding video processing packages in the preset network model according to a principle that a training weight of a video processing package corresponding to a larger recommendation point value is larger, to obtain the package recommendation model.

The manner of step 662 to step 663 is equivalent to filtering out some video training samples with relatively low popularities using a predetermined point value. The video training samples filtered out are not inputted into the preset network model for performing training. Relatively low recommendation point values indicate that corresponding video training samples are unlikely to be approved and liked by most users and belong to extremely niche samples. Therefore, although the video training samples are used as samples for performing training, it would also be difficult for the package recommendation model obtained through training to recommend video processing packages corresponding to the video training samples to a user for use. Therefore, to reduce a data amount of model training and learning, and to improve effectiveness of the package recommendation model, filter processing of step 662 may be first performed.

In step 512, the terminal device performs word vector representation on the scene description information, to obtain a video content feature variable.

In a process of package matching, for the scene description information, video content may alternatively be determined in a deep learning manner, thereby further obtaining a video content feature variable. Specifically, a video sequence frame (for example, the video sequence frame of the foregoing preview video or the video sequence frame of the target video) corresponding to the scene description information may be inputted into a detection network model. The detection network model may automatically recognize objects and object locations in each frame of image, perform classification and marking on the objects, and finally add tags to the scene description information by using recognition results. In other words, the terminal device may perform word vector representation on the scene description information by using the detection network model, to obtain a video content feature variable that can be recognized and processed by the detection network model.

Figure 7:
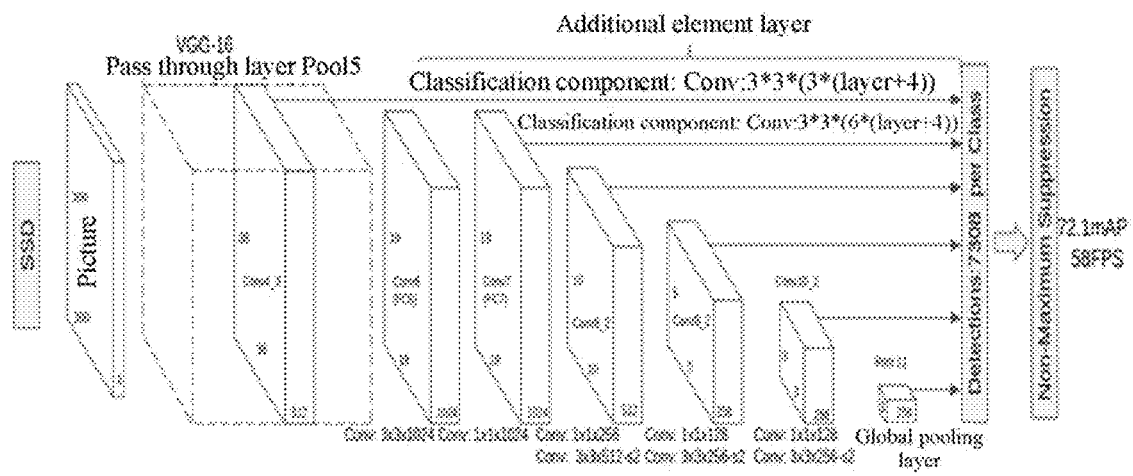
FIG. 7 is a schematic diagram of an SSD network architecture according to an embodiment of this application.

Currently, there are many detection network models such as an R-CNN, a faster R-CNN, YOLO, and an SSD. In this embodiment of this application, a process of obtaining a video content feature variable is described by using an SSD network architecture as an example. FIG. 7 is a schematic diagram of an SSD network architecture, and a training process of the SSD network architecture is as follows:

(1) First perform basic feature extraction on a video sequence frame by using a basic network, for example, extract basic features such as a color feature and a shape feature. As shown in FIG. 7, a basic network in the SSD network architecture is a VGG-16 network. Because in this embodiment of this application, a relatively high processing rate is needed to satisfy a recognition requirement of a dynamic video, the VGG-16 network in the SSD network architecture may be replaced with a lightweight mobilenet network.

(2) Add a fully connected layer and a convolutional layer to obtain a feature map, that is, generate a feature image based on the extracted basic features.

(3) Set a predicted target block on the feature map newly added, and perform prediction on a location of a shot object by using the prediction target block.

(4) Predict a category of the prediction target block, and compare the prediction target block with an actually marked block of the shot object, to calculate a loss.

(5) Perform continuous learning in an iterative training manner, to make an object category, a block size, and a location corresponding to the prediction target block close to those of the actually marked block.

Learning is continuously performed according to the foregoing procedure. When a standard is achieved, it may be considered that a video content feature variable of a video sequence frame for the scene description information is obtained.

Description is provided above by using an example in which package matching is performed by using the terminal device. When performed by another device (such as an application server or a modeling server), the operation of matching a package may be performed in a similar manner.

In step 513, the terminal device inputs the video content feature variable into a package recommendation model for performing package matching, to obtain at least one recommended video processing package matching the scene description information. After the video content feature variable is obtained, the video content feature variable may be used as an input variable and inputted to the package recommendation model to match a corresponding video processing package. For example, "one baby" is used as the video content feature variable and inputted to the package recommendation model. The package recommendation model may recommend one or more recommended video processing packages. For example, the package recommendation model may recommend video processing packages corresponding to three video training samples with largest recommendation point values, that is, three recommended video processing packages may be obtained.

If the package recommendation model only recommends one video processing package, the one video processing package may be directly used as the final target video processing package.

If the package recommendation model recommends a plurality of video processing packages, the final target video processing package may be determined by selecting one of the following manners according to an actual usage requirement.

Solution 1. Perform step 514. That is, the terminal device determines a video processing package with the highest usage frequency in the at least one recommended video processing package as the target video processing package. The usage frequency herein may be measured by using a recommendation point value, that is, a video processing package corresponding to the largest recommendation point value is determined as the target video processing package. In this way, the processed target video can accord with preferences of common users.

Solution 2. Perform step 515. That is, the terminal device first determines, according to user attribute information, a video processing package matching the user attribute information. For ease of description, in this embodiment of this application, the video processing package matching the user attribute information is referred to as a priority video processing package. Then, a video processing package having a maximum similarity with the priority video processing package is determined in the at least one recommended video processing package, and finally the video processing package with the largest similarity is determined as the final target video processing package.

The user attribute information may be preferences of a user that are set when the user uses a video APP for the first time, such as a video effect preference, for example, a filter, a beauty level, and a special effect, and a video theme preference, such as videos of a child theme and a makeup and beauty theme, and related information of the user that are filled when the user registers with the video APP such as a gender, an age, a life stage (unmarried, married, pregnant, bearing a baby, or in a relationship), and a career. In other words, a video effect that the user likes may be roughly known through the user attribute information. Therefore, a priority video processing package matching the user may be estimated according to the factors.

In other words, in the solution 2, one video processing package that accords with an actual preference of the user, such as a video processing package with the maximum similarity, may be selected according to a plurality of video processing packages recommended by the package recommendation model and the actual preference of the user, and used as the final target video processing package. In this way, differentiated requirements of users may be satisfied, and target video processing packages may be obtained through matching with actual requirements of the users as much as possible.

Solution 3:

The terminal device first determines a priority video processing package matching user attribute information.

In step 516, the terminal device determines whether there is a recommended video processing package having a similarity with a priority video processing package greater than or equal to a predetermined similarity in the at least one recommended video processing package.

In step 517, the terminal device determines, in a case that there is a recommended video processing package having a similarity with the priority video processing package greater than or equal to the predetermined similarity in the at least one recommended video processing package, a recommended video processing package having a maximum similarity as the target video processing package.

In step 518, the terminal device determines, in a case that there is no recommended video processing package having a similarity with the priority video processing package greater than or equal to the predetermined similarity in the at least one recommended video processing package, the priority video processing package as the target video processing package.

In other words, the plurality of video processing packages recommended by the package recommendation model may be screened by using the predetermined similarity and the priority video processing package. If the similarity is lower than the predetermined similarity, it indicates that the recommended video processing package differs greatly from an actual requirement of a user. If in this case, the target video is still processed by using the recommended video processing package, video effects obtained through the processing do not satisfy the user to a large extent. Therefore, in this case, to satisfy the current actual requirement of the user as much as possible, if all the recommended video processing packages do not satisfy the foregoing condition, the priority video processing package may be directly used as the final target video processing package temporarily.

In addition, for a scenario in which a modeling server matches a target video processing package according to the scene description information, the modeling server may perform word vector representation on the scene description information, to obtain a video content feature variable; analyze the video content feature variable, to determine an environment and/or categories and a quantity of objects corresponding to the target shooting scene; obtain through matching one video processing manner for the determined environment and/or different categories of objects separately, and use a video processing package including a plurality of video processing manners obtained through matching as the final target video processing package. In other words, one set of corresponding video processing manners may be separately obtained through matching for different objects. In this way, targeted differentiated processing may be performed on different categories of objects, to improve diversity of video processing as much as possible. In addition, because a set of video processing manners determined for each category of object is also recommended by the trained package recommendation model, popular requirements may also be satisfied as much as possible, to ensure universality of the solution.

For example, it is detected that the environment of the target shooting scene is clear sky, and shot objects included in the environment are a kid, a middle-aged woman, and a cat. Therefore, one set of corresponding video processing manners may be separately obtained through matching for the clear sky, the kid, the middle-aged woman, and the cat, so that four sets of video processing manners may be obtained. Then, a combination of the four sets of video processing manners is determined as the final target video processing package for performing recommendation.

In addition, in a process of performing recommendation, the modeling server may further obtain user attribute information and/or historical viewing information of a user; then perform word vector representation on the user attribute information and/or the historical viewing information, to obtain an auxiliary feature variable separately; and finally input the foregoing video content feature variable obtained according to the scene description information and the auxiliary feature variable obtained herein together into the package recommendation model for performing package matching, to further obtain the recommended target video processing package. It may be seen that, for a scenario in which the modeling server performs the package matching and recommendation, there is always only one video processing package finally recommended by the modeling server. A manner in which the user attribute information and the historical viewing information are used as auxiliary recommendation factors also ensures that an actual factor of a user is considered in the recommendation process, thereby accurately recommending a package.

Second Manner:

In the second manner, the target video processing package is determined by using a preset set of correspondences between scenes and video processing packages, and a specific procedure is shown in step 521 to step 523 in FIG. 5, and is described in detail as follows:

Step 521. The terminal device determines a preset set of correspondences between scenes and video processing packages.

In other words, a user may preset correspondences between scenes and video processing packages, for example, a package A is used for a baby, a package B is used for a baby and a mother, a package C is used for a baby and a father, and a package D is used for a pet (a cat or a dog). Certainly, in a setting process, a scene may be set by shooting a segment of video in advance or in a manner of previewing a video, thereby further setting a corresponding video processing package for each scene. In another possible implementation, the correspondences may alternatively be configured by a video APP by default.

In step 522, the terminal device inputs the scene description information into the foregoing set of correspondences for performing a matching search, to obtain a video processing package having the highest matching degree with the scene description information.

In step 523, the terminal device determines the video processing package having the highest matching degree with the scene description information as the target video processing package.

In the second manner, appropriate video processing packages may be automatically obtained through matching for different video shooting scenes by using the foregoing preset correspondences, to satisfy an actual shooting requirement of a user, and may be customized by the user, to facilitate modification and updating at any time. Therefore, the actual requirement of the user can be satisfied to a relatively large extent.

In step 33, the terminal device obtains a target video obtained by shooting the target shooting scene.

In addition, before, after, and when the target video processing package is obtained through matching, the target video may be obtained according to an actual situation.

In step 34, the terminal device processes the target video according to the target video processing package, to obtain a processed target video. After the target video is processed by using the target video processing package, the target video may have a corresponding video effect, and a beautification degree of the video is improved.

In step 35, the terminal device transmits the processed target video to a corresponding application server, and the application server may receive the processed target video.

In step 36, the application server reviews the processed target video that is received, and publishes the target video after the review is passed.

Finally, to implement social sharing, the processed target video may further be published on a network. A publishing process is specifically shown as step 35 and step 36. Specifically, a video publishing process in the related art may be performed. The details are not described herein.

In addition, considering a situation in which the shooting scene changes, in this embodiment of this application, in a case that the scene description information indicates that a shot object in the target shooting scene changes, target video processing packages before and after the shot object changes may be separately determined, and further a video obtained through shooting is processed separately by using the corresponding target video processing packages before and after the shot object changes. In this way, the video may be correspondingly processed by using different video processing packages before and after a scene changes, so that effectiveness of video processing may be improved.

Figure 8:
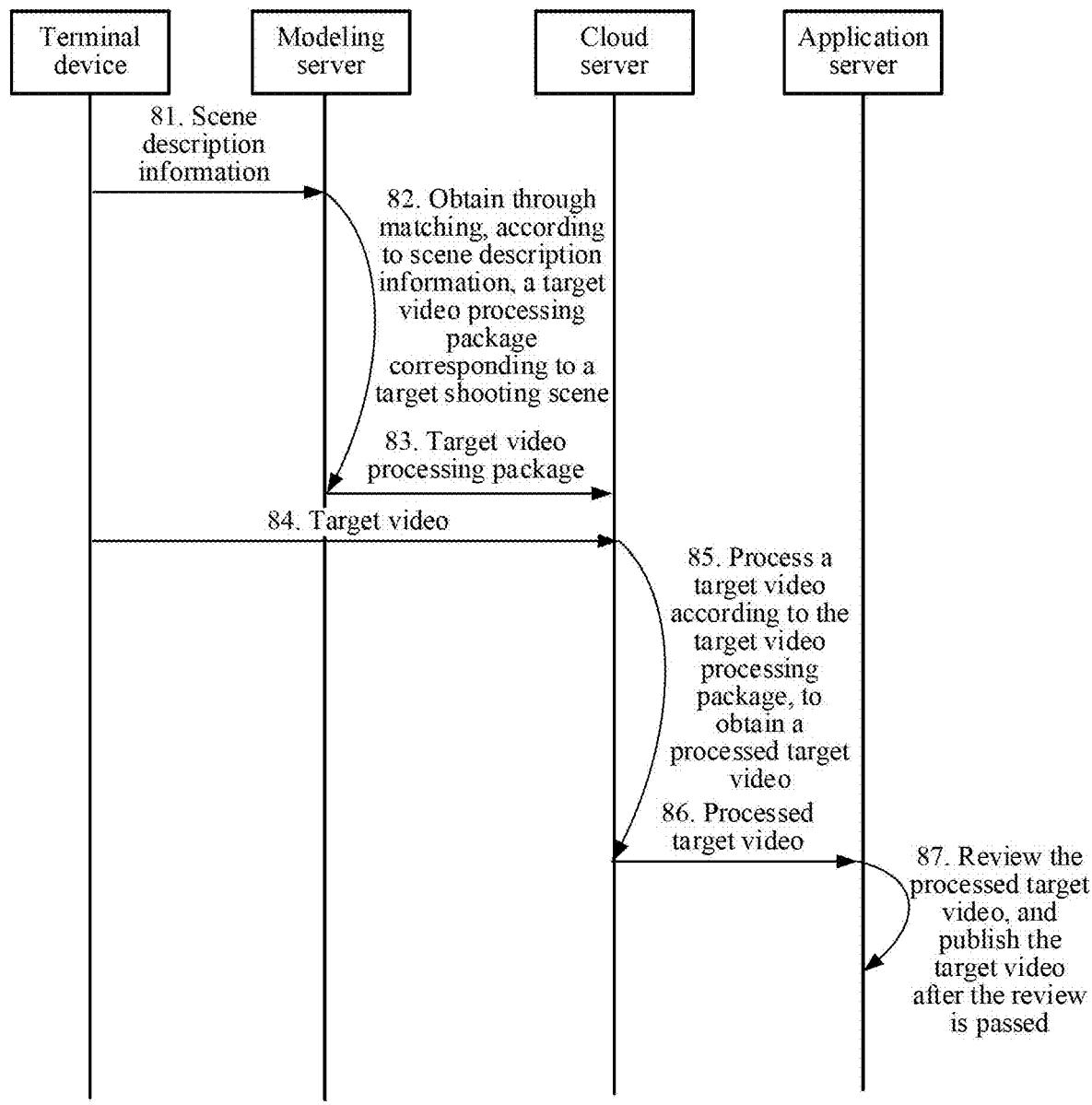
FIG. 8 is another schematic diagram of a video processing method according to an embodiment of this application.

As described above, an operation of obtaining through matching a package and an operation of processing the target video may be performed by using different execution bodies. To facilitate understanding of a person skilled in the art, the following describes one of the possible implementations by using a flowchart shown in FIG. 8.

In step 81, the terminal device transmits the scene description information to a modeling server. The modeling server may receive the scene description information.

In step 82, the modeling server obtains through matching, according to the scene description information, a target video processing package corresponding to the target shooting scene. Specifically, recommendation may be performed by using a package recommendation model in the modeling server.

In step 83, the modeling server transmits the target video processing package obtained through matching to a cloud server. The cloud server may receive the target video processing package.

In step 84, the terminal device transmits the obtained target video to the cloud server. The cloud server may receive the target video.

In step 85, the cloud server processes the target video according to the target video processing package, to obtain a processed target video.

An order between the foregoing step 83 and step 84 may be changed. That is, the cloud server may first receive the target video processing package, and then receive the target video, or may first receive the target video, and then receive the target video processing package, or simultaneously receive the target video and the target video processing package. After receiving the target video and the target video processing package, the cloud server processes the target video according to the target video processing package, to obtain a processed target video.

In step 86, the cloud server transmits the processed target video to an application server. The application server may receive the processed target video.

In step 87, the application server reviews the processed target video, and publishes the target video after the review is passed.

In the foregoing embodiments, a user may select whether to enable a function of automatically obtaining through matching a video processing package. If the user disables the function, the user is allowed to use various video processing manners set by the user, and process a video shot by the user by using a video processing package formed by the video processing manners set by the user. A person skilled in the art may specifically implement the solution based on the foregoing disclosed embodiments. This is not described in detail in this embodiment of this application.

Based on the same application idea, an embodiment of this application provides a terminal device. The terminal device may be, for example, the foregoing terminal device 21 in FIG. 2A to FIG. 2C. The terminal device may be a hardware structure, a software module, or a hardware structure adding a software module. The terminal device may be implemented by a chip system, and the chip system may include a chip, or may include a chip and another discrete device.

Figure 9:
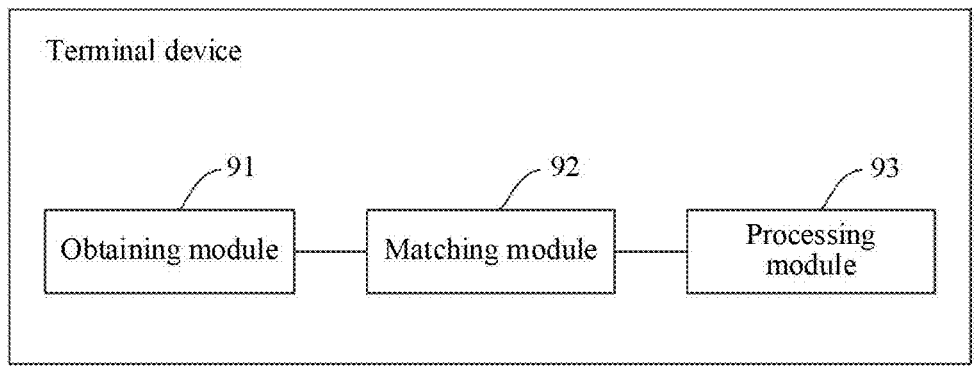
FIG. 9 is a structural block diagram of a terminal device according to an embodiment of this application.

Referring to FIG. 9, a terminal device according to an embodiment of this application may include an obtaining module 91, a matching module 92, and a processing module 93. Of course, it should be understood that one or more of the modules described in this disclosure can be implemented with processing circuitry.

The obtaining module 91 is configured to obtain scene description information of a target shooting scene.

The matching module 92 is configured to obtain through matching, according to the scene description information, a target video processing package corresponding to the target shooting scene, the target video processing package including at least one video processing manner for processing a video in a predetermined processing mode.

The processing module 93 is configured to process, according to the target video processing package, a target video obtained by shooting the target shooting scene.

In a possible implementation, the matching module 92 is configured to perform word vector representation on the scene description information, to obtain a video content feature variable, input the video content feature variable into a pre-established package recommendation model for performing package matching, to obtain at least one recommended video processing package matching the scene description information, and determine the target video processing package according to the at least one recommended video processing package.

In a possible implementation, the matching module 92 is configured to determine a video processing package with the highest usage frequency in the at least one recommended video processing package as the target video processing package, or determine a video processing package having a maximum similarity with a priority video processing package in the at least one recommended video processing package as the target video processing package, the priority video processing package being a video processing package that is obtained through matching according to user attribute information.

In a possible implementation, the matching module 92 is configured to determine whether there is a recommended video processing package having a similarity with a priority video processing package greater than or equal to a predetermined similarity in the at least one recommended video processing package, the priority video processing package being a video processing package that is obtained through matching according to user attribute information, and determine, in a case that there is a recommended video processing package having a similarity with the priority video processing package greater than or equal to the predetermined similarity in the at least one recommended video processing package, a recommended video processing package having a maximum similarity as the target video processing package. The matching module 92 can further be configured to determine, in a case that there is no recommended video processing package having a similarity with the priority video processing package greater than or equal to the predetermined similarity in the at least one recommended video processing package, the priority video processing package as the target video processing package.

In a possible implementation, the matching module 92 can be configured to input the scene description information into a preset set of correspondences between scenes and video processing packages for performing a matching search, to obtain a video processing package having the highest matching degree with the scene description information, and determine the video processing package having the highest matching degree with the scene description information as the target video processing package.

In a possible implementation, the matching module 92 can be configured to determine separately, in a case that the scene description information indicates that a shot object in the target shooting scene changes, target video processing packages before and after the shot object changes. The processing module 93 can be configured to process separately a video obtained through shooting by using the corresponding target video processing packages before and after the shot object changes.

In a possible implementation, the obtaining module 91 can be configured to obtain a preview video of the target shooting scene, or obtain the target video actually shot in the target shooting scene. Further, the obtaining module 91 can be configured to perform image recognition on a video sequence frame of the preview video or a video sequence frame of the target video, to obtain key feature information of each frame, the key feature information being feature information of a shot object occupying the largest area and/or visually presented in the foremost location in each frame, and determine the scene description information according to key feature information of all frames.

For all related content of the steps in the foregoing video processing method embodiments shown in FIG. 3 and FIG. 5, refer to function descriptions of corresponding functional modules in this embodiment of this application, and details are not described herein again.

Division of the modules in the embodiments of this application is only an example, and is merely logical function division. There may be other division manners during actual implementation. In addition, the functional modules in the embodiments of this application may be integrated into one processor, or each of the modules may exist alone physically, or two or more modules may be integrated into one module. The foregoing integrated module may be implemented in a hardware form or a form of a software function module.

Based on the same application idea, an embodiment of this application provides a server. For example, the server may be the foregoing server 24, that is, the modeling server, in FIG. 2A to FIG. 2C. The server may be a hardware structure, a software module, or a hardware structure adding a software module. The terminal device may be implemented by a chip system, and the chip system may include a chip, or may include a chip and another discrete device.

Figure 10:
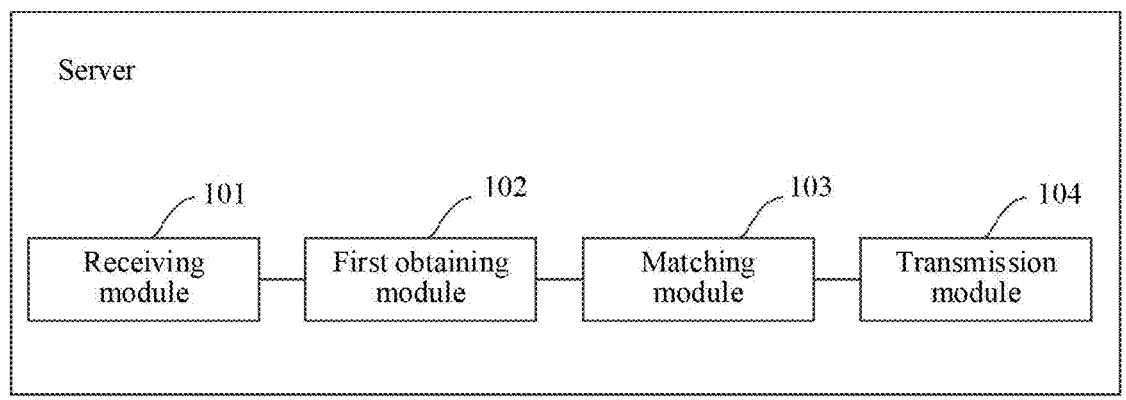
FIG. 10 is a structural block diagram of a server according to an embodiment of this application.

Referring to FIG. 10, a server according to an embodiment of this application may include a receiving module 101, a first obtaining module 102, a matching module 103, and a transmitting module 104.

The receiving module 101 is configured to receive scene description information of a target shooting scene transmitted by a terminal device.

The first obtaining module 102 is configured to perform word vector representation on the scene description information, to obtain a video content feature variable.

The matching module 103 is configured to input the video content feature variable into a pre-established package recommendation model for performing package matching, to obtain a target video processing package matching the target shooting scene, the target video processing package including at least one video processing manner for processing a video in a predetermined processing mode.

The transmitting module 104 is configured to transmit the target video processing package to the terminal device or a cloud server, to enable the terminal device or the cloud server to process, according to the target video processing package, a target video obtained by shooting the target shooting scene.

In a possible implementation, the matching module 103 is configured to analyze the video content feature variable, to determine an environment and/or categories and a quantity of objects corresponding to the target shooting scene, obtain through matching one video processing manner for the determined environment and/or different categories of objects separately, and use a video processing package including a plurality of video processing manners obtained through matching as the target video processing package.

In a possible implementation, the server further includes a second obtaining module and a third obtaining module. The second obtaining module is configured to obtain user attribute information and/or historical viewing information of a user corresponding to the terminal device. The third obtaining module is configured to perform word vector representation on the user attribute information and/or the historical viewing information separately, to obtain an auxiliary feature variable.

The matching module 103 is configured to input the video content feature variable and the auxiliary feature variable together into the package recommendation model for performing package matching, to obtain the target video processing package.

In a possible implementation, the server further includes a model establishment module, configured to select a plurality of videos from videos that have been published as video training samples, and mark shooting environments and/or shot objects of the video training samples based on image recognition results of video sequence frames included in the video training samples, to obtain video content tags of the video training samples. Further, the module can be configured to extract video processing packages used by the video training samples, and input the video content tags of the video training samples and the corresponding video processing packages as training features into a preset network model for performing training and learning, to obtain the package recommendation model.

In a possible implementation, the model establishment module can be configured to determine recommendation point values of the video training samples according to historical interaction data of the video training samples, the historical interaction data of the video training samples being used for indicating interaction statuses between users and the video training samples, and perform training and learning after establishing associations between the recommendation point values of the video training samples and the corresponding video processing packages according to a predetermined association rule, to obtain the package recommendation model.

In a possible implementation, the model establishment module is configured to perform association training on the video content tags and the corresponding video processing packages in the preset network model according to a principle that a training weight of a video processing package corresponding to a larger recommendation point value is larger, to obtain the package recommendation model. Alternatively, the module can be configured to determine target video content tags whose recommendation point values are greater than or equal to a predetermined point value, and then perform association training on the target video content tags and corresponding video processing packages in the preset network model according to a principle that a training weight of a video processing package corresponding to a larger recommendation point value is larger, to obtain the package recommendation model.

For all related content of the steps in the foregoing video processing method embodiment shown in FIG. 6, refer to function descriptions of corresponding functional modules in this embodiment of this application, and details are not described herein again.

Division of the modules in the embodiments of this application is only an example, and is merely logical function division. There may be other division manners during actual implementation. In addition, the functional modules in the embodiments of this application may be integrated into one processor, or each of the modules may exist alone physically, or two or more modules may be integrated into one module. The foregoing integrated module may be implemented in a hardware form or a form of a software function module.

Based on the same application idea, an embodiment of this application provides a server. For example, the server may be the foregoing server 23, that is, the cloud server, in FIG. 2A to FIG. 2C. The server may be a hardware structure, a software module, or a hardware structure adding a software module. The terminal device may be implemented by a chip system, and the chip system may include a chip, or may include a chip and another discrete device.

Figure 11:
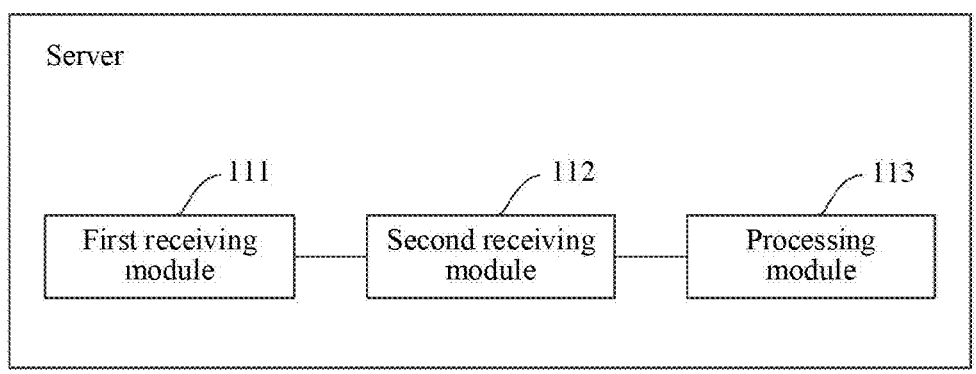
FIG. 11 is another structural block diagram of a server according to an embodiment of this application.

Referring to FIG. 11, a server according to an embodiment of this application may include a first receiving module 111, a second receiving module 112, and a processing module 113.

The first receiving module 111 is configured to receive scene description information of a target shooting scene transmitted by a terminal device and a target video obtained by shooting the target shooting scene.

The second receiving module 112 is configured to receive a target video processing package transmitted by the terminal device or a modeling server, the target video processing package being a video processing package that is obtained through matching according to the scene description information and that corresponds to the target shooting scene, and the target video processing package including at least one video processing manner for processing a video in a predetermined processing mode.

The processing module 113 is configured to process the target video according to the target video processing package.

Division of the modules in the embodiments of this application is only an example, and is merely logical function division. There may be other division manners during actual implementation. In addition, the functional modules in the embodiments of this application may be integrated into one processor, or each of the modules may exist alone physically, or two or more modules may be integrated into one module. The foregoing integrated module may be implemented in a hardware form or a form of a software function module.

Based on the same application idea, an embodiment of this application further provides another video processing apparatus. The video processing apparatus may be a terminal device, for example, a smartphone, a tablet computer, a PDA, a notebook computer, an in-vehicle device, a smart wearable device, which can implement functions of the terminal device in the foregoing video processing method shown in FIG. 3 and FIG. 5. Alternatively, the video processing apparatus may be an apparatus that can support the terminal device to implement functions of the terminal device in the foregoing video processing method. The video processing apparatus may be a hardware structure, a software module, or a hardware structure adding a software module. The video processing apparatus may be implemented by a chip system. The chip system may include a chip, or may include a chip and another discrete device.

Figure 12:
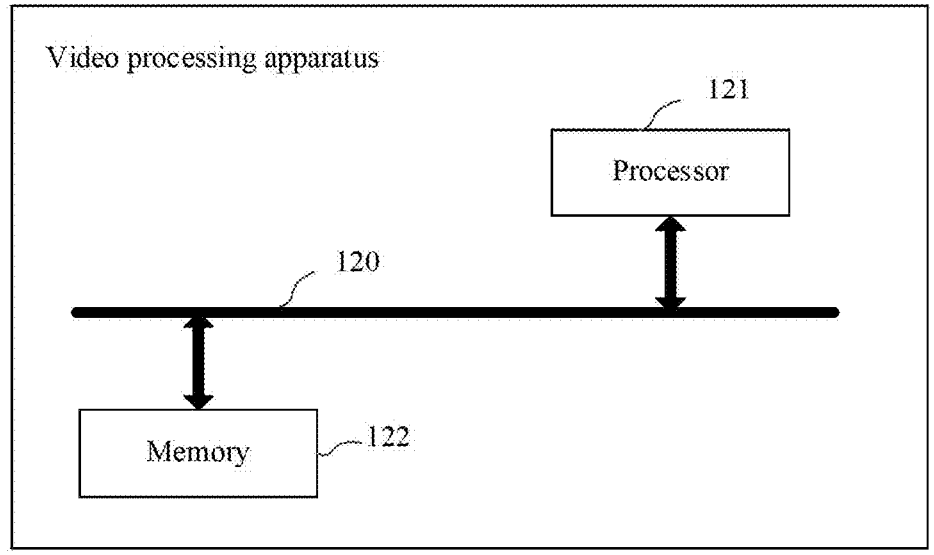
FIG. 12 is a schematic structural diagram of a video processing apparatus according to an embodiment of this application.

As shown in FIG. 12, a video processing apparatus according to an embodiment of this application includes at least one processor 121 and a memory 122 connected to the at least one processor. A specific medium connecting the processor 121 and the memory 122 is not limited in this embodiment of this application. In FIG. 12, for example, the processor 121 and the memory 122 are connected by using a bus 120. The bus 120 is represented by using a thick line in FIG. 12, and a connection manner between other components is merely described as an example, and is not limited thereto. The bus 120 may be classified into an address bus, a data bus, a control bus, and the like. For ease of representation, only one bold line is used for representation in FIG. 12, but it does not indicate that there is only one bus or one type of bus.

In this embodiment of this application, the memory 122 stores instructions executable by the at least one processor 121. The at least one processor 121 may perform steps included in the foregoing video processing method by executing the instructions stored in the memory 122.

The processor 121 is a control center of the video processing apparatus, which may be connected to various parts of the entire video processing apparatus by using various interfaces and lines, and by running or executing the instructions stored in the memory 122 and invoking data stored in the memory 122, to perform various functions of the video processing apparatus and process data, so as to perform overall monitoring on the video processing apparatus. Optionally, the processor 121 may include one or more processing units. Optionally, the processor 121 may integrate an application processor and a modem processor. The application processor mainly processes an operating system, a user interface, an application program, and the like. The modem processor mainly processes wireless communication. It may be understood that the foregoing modem may alternatively not be integrated into the processor 121. In some embodiments, the processor 121 and the memory 122 may be implemented in a same chip. In some embodiments, they may be separately implemented in independent chips.

The processor 121 may be a general purpose processor, such as a central processing unit (CPU), a digital signal processor, an application-specific integrated circuit (ASIC), a field programmable gate array or another programmable logic device, a discrete gate or a transistor logic device, or a discrete hardware component, and may implement or perform the methods, steps, and logical block diagrams disclosed in the embodiments of this application. The general purpose processor may be a microprocessor, any conventional processor, or the like. The steps of the methods disclosed with reference to the embodiments of this application may be directly performed and completed by a hardware processor, or may be performed and completed by using a combination of hardware and software modules in the processor.

The memory 122, as a non-transitory computer-readable storage medium, may be configured to store a non-transitory software program, a non-transitory computer-executable program and a module. The storage unit 122 may include at least one type of storage medium. For example, the storage media may include a flash memory, a hard disk, a multimedia card, a card type memory, a random access memory (RAM), a static RAM (SRAM), a programmable read only memory (PROM), a read only memory (PROM), an electrically erasable programmable ROM (EEPROM), a magnetic memory, a magnetic disk, and an optical disc. Alternatively, the memory 122 is any other medium that can be used to carry or store expected program code that has an instruction or data structure form, and that can be accessed by a computer, but is not limited thereto. The memory 122 according to this embodiment of this application may be further a circuit or any other apparatus that can implement a storage function, and is configured to store program instructions and/or data.

Figure 13:
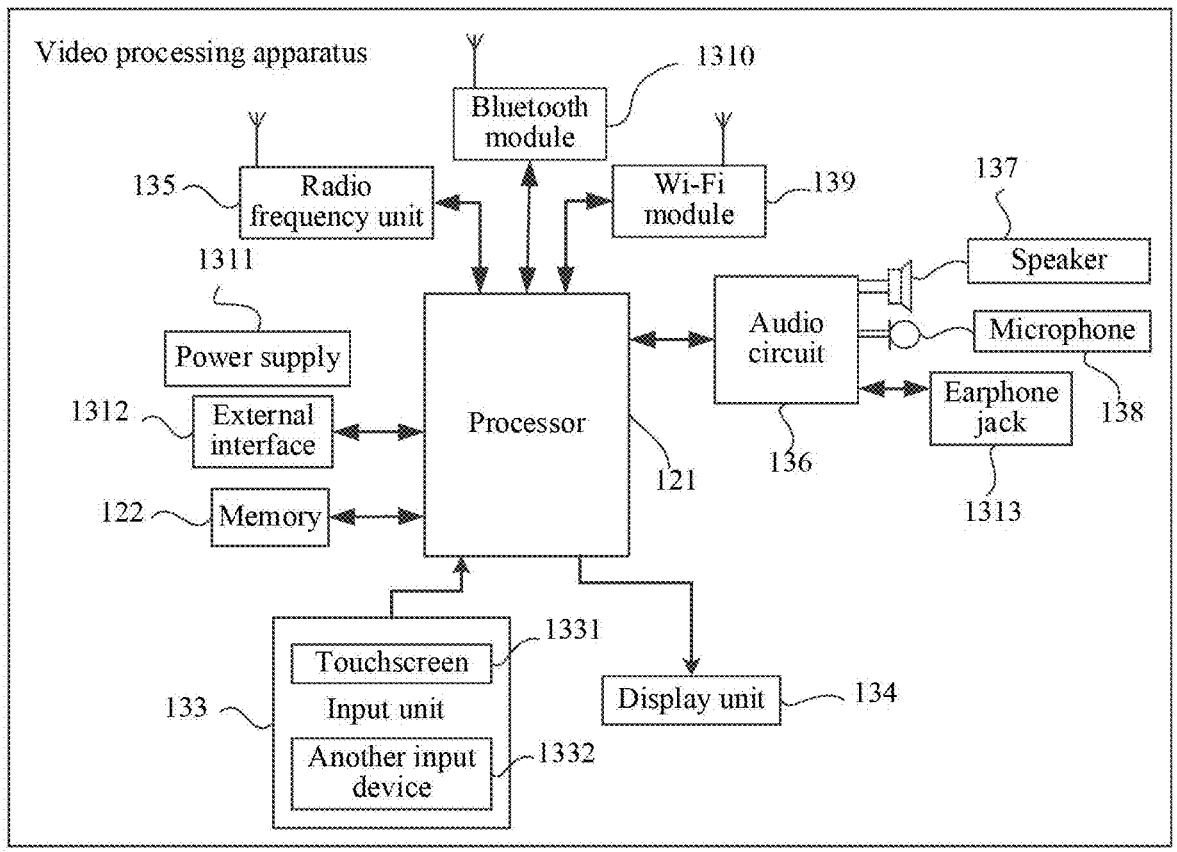
FIG. 13 is another schematic structural diagram of a video processing apparatus according to an embodiment of this application.

FIG. 13 is another schematic structural diagram of a video processing apparatus. The video processing apparatus may further include components such as an input unit 133, a display unit 134, a radio frequency unit 135, an audio circuit 136, a speaker 137, a microphone 138, a Wi-Fi module 139, a Bluetooth module 1310, a power supply 1311, an external interface 1312, and an earphone jack 1313. A person skilled in the art may understand that, FIG. 13 is merely an example of the video processing apparatus and is not intended to limit the video processing apparatus, and the video processing apparatus may include more or fewer components than those shown in the figure, or some components may be combined, or different components are used.

The input unit 133 may be configured to receive input digit or character information, and generate a keyboard signal input related to the user setting and function control of the video processing apparatus. For example, the input unit 133 may include a touchscreen 1331 and another input device 1332. The touchscreen 1331 may collect a touch operation performed by a user on or nearby the touchscreen 1331 (for example, an operation performed by the user by using a finger, a joint, a stylus, or any suitable object on or near the touchscreen 1331). That is, the touchscreen 1331 may be configured to detect a touch pressure, a touch input location, and a touch input area, and drive a corresponding connection device according to a preset program. The touchscreen 1331 may detect a touch control operation performed by the user on the touchscreen 1331, and convert the touch control operation into a touch control signal and transmit the touch control signal to the processor 121. Alternatively, it is understood that the touchscreen 1331 may transmit touch control information of the touch control operation to the processor 121, and can receive a command transmitted by the processor 121 and execute the command. The touch control information may at least include at least one of pressure value information or pressure duration information. The touchscreen 1331 may provide an input interface and an output interface between the video processing apparatus and the user. In addition, the touchscreen 1331 may be implemented in various types such as a resistance type, a capacitance type, an infrared type, and a surface acoustic wave type. In addition to the touchscreen 1331, the input unit 133 may further include the another input device 1332. The another input device 1332 may include, but is not limited to, one or more of a physical keyboard, a functional key (such as a volume control key or a switch key), a track ball, a mouse, and a joystick.

The display unit 134 may be configured to display information input by the user or information provided for the user, and various menus of the video processing apparatus. The touchscreen 1331 may cover the display unit 134. After detecting a touch control operation on or near the touchscreen 1331, the touchscreen 1331 transfers the touch control operation to the processor 121 to determine pressure information of the touch control operation. In the embodiments of this application, the touchscreen 1331 and the display unit 134 may be integrated into one component, to implement input, output, and display functions of the video processing apparatus. For convenience of description, this embodiment of this application provides descriptions by using an example in which the touchscreen 1331 represents a function set of the touchscreen 1331 and the display unit 134. Certainly, in some embodiments, the touchscreen 1331 and the display unit 134 may also be used as two independent components.

When the display unit 134 and a touch panel are superposed on each other in the form of layers to form the touchscreen 1331, the display unit 134 may be used as an input apparatus and an output apparatus. When used as the output apparatus, the display unit 134 may be used to display an image, for example, playing various videos. The display unit 134 may include at least one of a liquid crystal display (LCD), a thin film transistor LCD (TFT-LCD), an organic light-emitting diode (OLED) display, an active matrix organic light-emitting diode (AMOLED) display, an in-plane switching (IPS) display, a flexible display, a 3D display, and the like. Some of the displays may be constructed as transparent to allow a user to view the displays from the outside, which can be referred to as transparent displays. According to a specific desired implementation, the video processing apparatus may include two or more display units (or another display apparatus). For example, the video processing apparatus may include an external display unit (not shown in FIG. 13) and an internal display unit (not shown in FIG. 13).

The radio frequency unit 135 may be configured to receive and transmit information or receive and transmit a signal during a call. Generally, the radio frequency circuit includes, but is not limited to, an antenna, at least one amplifier, a transceiver, a coupler, a low noise amplifier (LNA), and a duplexer. In addition, the radio frequency module 135 may further communicate with another device by using radio communication and a network device. The wireless communication may use any communication standard or protocol, which includes, but is not limited to, Global System for Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The audio circuit 136, the speaker 137, and the microphone 138 may provide audio interfaces between the user and the video processing apparatus. The audio circuit 136 may transmit, to the speaker 137, an electrical signal obtained by converting received audio data, and the speaker 137 converts the electrical signal into a voice signal for outputting. On the other hand, the microphone 138 converts a collected voice signal into an electrical signal, and the audio circuit 136 receives the electrical signal, converts the electrical signal into audio data, and outputs the audio data to the processor 121. The processor 121 processes the audio data, and sends the audio data to, for example, another electronic device by using the radio frequency unit 135, or outputs the audio data to the memory 122 for further processing. The audio circuit may also include the earphone jack 1313, to provide a connection interface between the audio circuit and an earphone.

Wi-Fi belongs to a short distance radio transmission technology. The video processing apparatus may help, by using the Wi-Fi module 139, the user receive and transmit emails, browse a web page, access streaming media, and the like, which provides wireless broadband Internet access for the user. Although FIG. 13 shows the Wi-Fi module 139, it may be understood that, the Wi-Fi module 139 is not a necessary component of the video processing apparatus, and when required, the Wi-Fi module may be omitted provided that the scope of the essence of this application is not changed.

Bluetooth is a short distance wireless communication technology. A Bluetooth technology can effectively simplify communication between mobile communication terminal devices such as a palmtop computer, a notebook computer, and a mobile phone, and can also successfully simplify communication between the devices and the Internet. By using the Bluetooth module 1310, data transmission between the video processing apparatus and the Internet becomes faster and more efficient, enhancing wireless communication. The Bluetooth technology is an open solution that can implement voice and data wireless transmission. Although FIG. 13 shows the Bluetooth module 1310, it may be understood that, the Bluetooth module 1310 is not a necessary component of the video processing apparatus, and when required, the Bluetooth module may be omitted provided that the scope of the essence of this application is not changed.

The video processing apparatus may further include the power supply 1311 (for example, a battery), and the power supply 1311 is configured to receive external power or supply power for the components in the video processing apparatus. The power supply 1311 may be logically connected to the processor 121 by using a power management system, thereby implementing functions such as charging, discharging, and power consumption management by using the power management system.

The video processing apparatus may further include the external interface 1312. The external interface 1312 may include a standard micro USB interface or may include a multi-pin connector, and may be configured to connect the video processing apparatus and another device for communication, or may be configured to connect a charger and the video processing apparatus for charging.

Although not shown, the video processing apparatus in this embodiment of this application may further include another possible functional module such as a camera or a flash. Details are not described herein.

Figure 14:
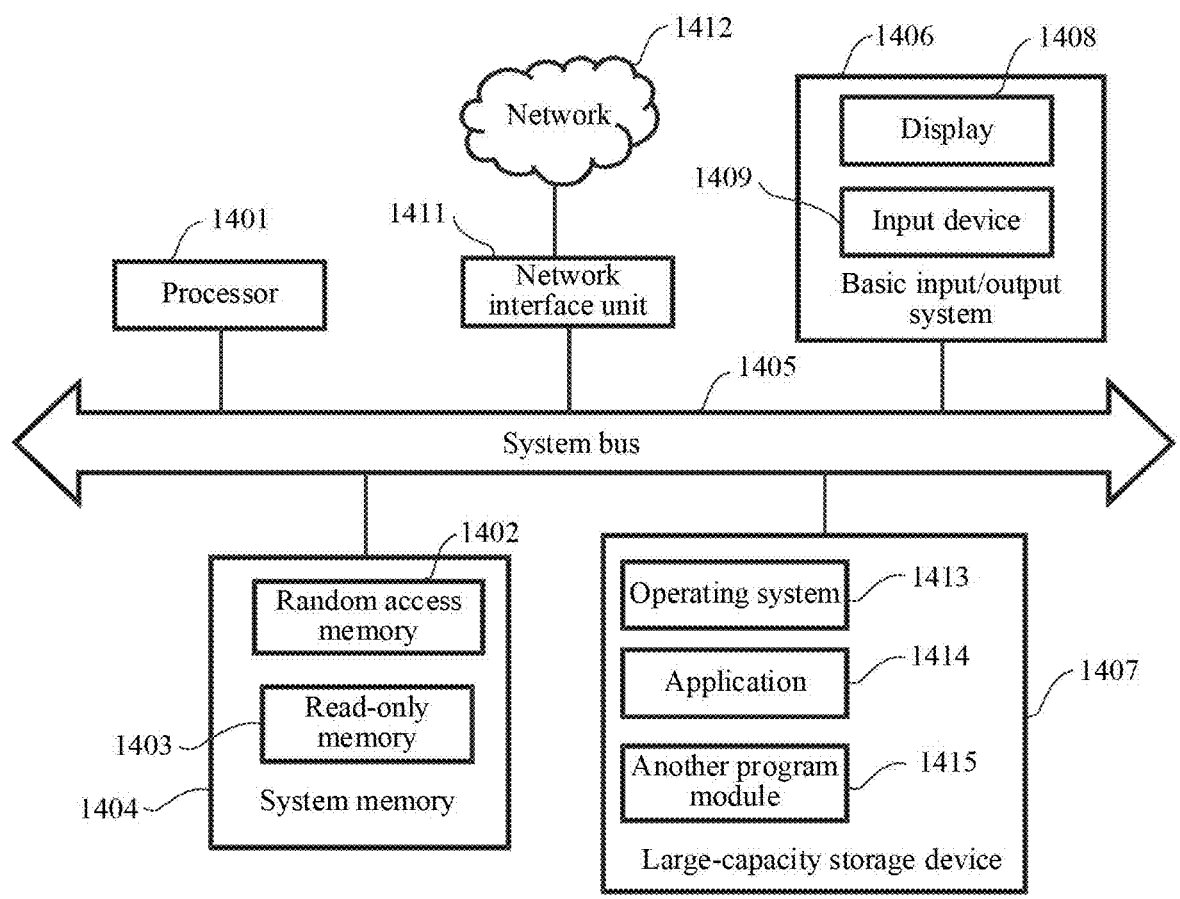
FIG. 14 is another schematic structural diagram of a video processing apparatus according to an embodiment of this application.

Based on the same application idea, an embodiment of this application further provides another video processing apparatus. FIG. 14 is a schematic structural diagram of a video processing apparatus according to an embodiment of this application. The video processing apparatus may be, for example, the server 22, the server 23, or the server 24 in FIG. 2A to 2C. Specifically, The video processing apparatus includes a processor 1401, a system memory 1404 including a RAM 1402 and a ROM 1403, and a system bus 1405 connecting the system memory 1404 and the processor 1401. The video processing apparatus further includes a basic input/output system (I/O system) 1406 assisting in transmitting information between devices in a computer, and a large-capacity storage device 1407 configured to store an operating system 1413, an application 1414 and another program module 1415.

The processor 1401 is a control center of the video processing apparatus, which may be connected to various parts of the entire video processing apparatus by using various interfaces and lines, and by running or executing the instructions stored in a memory (for example, the RAM 1402 and the ROM 1403) and invoking data stored in the memory, to perform various functions of the video processing apparatus and process data, so as to perform overall monitoring on the video processing apparatus.

Optionally, the processor 1401 may include one or more processing units. Optionally, the processor 1401 may integrate an application processor and a modem processor. The application processor mainly processes an operating system, a user interface, an application program, and the like. The modem processor mainly processes wireless communication. It may be understood that the foregoing modem may alternatively not be integrated into the processor 1401. In some embodiments, the processor 1401 and the memory may be implemented in the same chip. In some embodiments, they may be separately implemented in independent chips.

The processor 1401 may be a general purpose processor, such as a central processing unit (CPU), a digital signal processor, an application-specific integrated circuit (ASIC), a field programmable gate array or another programmable logic device, a discrete gate or a transistor logic device, or a discrete hardware component, and may implement or perform the methods, steps, and logical block diagrams disclosed in the embodiments of this application. The general purpose processor may be a microprocessor, any conventional processor, or the like. The steps of the methods disclosed with reference to the embodiments of this application may be directly performed and completed by a hardware processor, or may be performed and completed by using a combination of hardware and software modules in the processor.

The memory, as a non-transitory computer-readable storage medium, may be configured to store a non-transitory software program, a non-transitory computer-executable program and a module. The memory may include at least one type of storage medium. For example, the memory may include a flash memory, a hard disk, a multimedia card, a card type memory, a RAM, a static RAM (SRAM), a programmable ROM (PROM), a ROM, an electrically erasable programmable ROM (EEPROM), a magnetic memory, a magnetic disk, and an optical disc. The memory is any other medium that can carry or store expected program code in a form of an instruction or a data structure and can be accessed by a computer, but is not limited thereto. The memory according to this embodiment of this application may be further a circuit or any other apparatus that can implement a storage function, and is configured to store program instructions and/or data.

The basic I/O system 1406 includes a display 1408 configured to display information, and an input device 1409 configured to input information by a user, such as a mouse and a keyboard. The display 1408 and the input device 1409 are both connected to the processor 1401 by using the basic I/O system 1406 connected to the system bus 1405. The basic I/O system 1406 may further include an I/O controller for receiving and processing an input from a plurality of other devices such as a keyboard, a mouse, or an electronic stylus. Similarly, the input/output controller further provides an output to a display screen, a printer, or another type of output device.

The large-capacity storage device 1407 is connected to the processor 1401 by using a large-capacity storage controller (not shown) connected to the system bus 1405. The large-capacity storage device 1407 and an associated computer-readable medium provide non-volatile storage to the video processing apparatus. In other words, the large-capacity storage device 1407 may include the computer-readable medium (not shown) such as a hard disk or a CD-ROM driver.

In general, the non-transitory computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types. The system memory 1404 and the large-capacity storage device 1407 may be collectively referred to as a memory.

According to various embodiments of this application, the video processing apparatus may further be connected, by using a network such as the Internet, to a remote computer on the network and run. That is, the video processing apparatus may be connected to a network 1412 by using a network interface unit 1411 connected on the system bus 1405, or may be connected to a network of another type or a remote computer system (not shown) by using the network interface unit 1411.

Based on the same application idea, an embodiment of this application further provides a storage medium, storing computer instructions, the computer instructions, when being run on a computer, causing the computer to perform steps of the foregoing video processing method.

Based on the same application idea, an embodiment of this application further provides a video processing apparatus, including at least one processor and a readable storage medium. When instructions included in the readable storage medium are executed by the at least one processor, the processor may perform steps of the foregoing video processing method.

Based on the same application idea, an embodiment of this application further provides a chip system. The chip system includes a processor, and may further include a memory, and is configured to implement steps of the foregoing video processing method. The chip system may include a chip, or may include a chip and another discrete device.

In some possible implementations, the aspects of the video processing method provided in this application may be further implemented in a form of a program product, including program code, when the program product runs on a computer, the program code causing the computer to perform the steps described in the video processing method according to various exemplary implementations of this application.

A person skilled in the art is to know that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to flowcharts and/or block diagrams of the method, the device (system), and the computer program product according to the embodiments of this application. It is to be understood that computer program instructions can implement each process and/or block in the flowcharts and/or block diagrams and a combination of processes and/or blocks in the flowcharts and/or block diagrams. The computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

The computer program instructions may also be stored in a non-transitory computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art may make various modifications and variations to this application without departing from the spirit and scope of this application. This application is intended to cover the modifications and variations provided that the modifications and variations of this application fall within the scope of the claims of this application and their equivalent technologies.

INDUSTRIAL APPLICABILITY

This solution provides a method, including: obtaining scene description information of a target shooting scene, obtaining through matching, according to the scene description information, a target video processing package corresponding to the target shooting scene, and processing, according to the target video processing package, a target video obtained by shooting the target shooting scene. In the method, the corresponding target video processing package is automatically obtained through matching according to the scene description information, so that an operation of manually making a selection by a user in the related art is omitted. Therefore, matching efficiency of video processing manners may be improved. In addition, a plurality of video processing manners may be obtained through matching at a time, so that the matching efficiency is further improved. In addition, because the target video processing package is dynamically and correspondingly obtained through matching based on the scene description information, the target video processing package obtained through matching can accord with an actual video content. Therefore, accuracy of video processing may be improved.

What is claimed is:

1. A video processing method, comprising:
   receiving a target video;
   obtaining scene description information of a shooting scene in a sequence of images in the target video, the scene description information indicating features of the shooting scene in the sequence of images in the target video;
   obtaining, by processing circuitry, a video processing package that is determined to correspond to the shooting scene in the sequence of images in the target video based on i) a context of a reference scene based on associations between different features of different images of the reference scene in a sequence of images in a reference video to which the video processing package was previously applied and ii) a context of the shooting scene based on associations between different features of different images of the shooting scene in the sequence of images in the target video indicated by the scene description information, the video processing package being configured to add at least one content to the target video; and
   adding at least one content to the target video based on the video processing package.

2. The method according to claim 1, wherein the at least one content added by the video processing package includes at least one of visual content or audio content.

3. The method according to claim 1, wherein the at least one content added by the obtained video processing package includes visual content and audio content.

4. The method according to claim 1, wherein the obtaining the video processing package comprises:
   obtaining, by the processing circuitry, the video processing package that corresponds to the shooting scene in the target video based on a predetermined video processing package applied to another video.

5. The method according to claim 1, wherein the obtaining the video processing package comprises:
   obtaining the video processing package via a video application that is configured to capture the target video.

6. The method according to claim 1, wherein the obtaining the video processing package further comprises:
   performing word vector representation on the scene description information, to obtain a video content feature variable;
   inputting the video content feature variable into a pre-established package recommendation model for performing package matching, to obtain at least one recommended video processing package matching the scene description information; and determining the video processing package based on at least one recommended video processing package.

7. The method according to claim 6, wherein the determining the video processing package further comprises:

determining the video processing package in the at least one recommended video processing package based on at least one of usage frequency of the video processing package or similarity of the scene description information.

8. The method according to claim 1, wherein the obtaining the video processing package further comprises:

determining the video processing package based on the scene description information and a preset set of correspondences between predetermined shooting scenes and predetermined video processing packages.

9. A terminal device comprising processing circuitry configured to:

receive a target video;

obtain scene description information of a shooting scene in a sequence of images in the target video, the scene description information indicating features of the shooting scene in the sequence of images in the target video;

obtain a video processing package that is determined to correspond to the shooting scene in the sequence of images in the target video based on i) a context of a reference scene based on associations between different features of different images of the reference scene in a sequence of images in a reference video to which the video processing package was previously applied and ii) a context of the shooting scene based on associations between different features of different images of the shooting scene in the sequence of images in the target video indicated by the scene description information, the video processing package being configured to add at least one content to the target video; and add at least one content to the target video based on the video processing package.

10. The terminal device according to claim 9, wherein the at least one content added by the video processing package includes at least one of visual content or audio content.

11. The terminal device according to claim 9, wherein the at least one content added by video processing package includes visual content and audio content.

12. The terminal device according to claim 9, wherein the processing circuitry is configured to:

obtain the video processing package that corresponds to the shooting scene in the target video based on a predetermined video processing package applied to another video.

13. The terminal device according to claim 9, wherein the processing circuitry is configured to:

obtain the video processing package via a video application that is configured to capture the target video.

14. The terminal device according to claim 9, wherein the processing circuitry is configured to:

perform word vector representation on the scene description information, to obtain a video content feature variable;

input the video content feature variable into a pre-established package recommendation model for performing package matching, to obtain at least one recommended video processing package matching the scene description information; and determine the video processing package based on the at least one recommended video processing package.

15. The terminal device according to claim 14, wherein the processing circuitry is configured to:

determine the video processing package in the at least one recommended video processing package based on at least one of usage frequency of the video processing package or similarity of the scene description information.

16. The terminal device according to claim 9, wherein the processing circuitry is configured to:

determine the video processing package based on the scene description information and a preset set of correspondences between predetermined shooting scenes and predetermined video processing packages.

17. A non-transitory computer-readable storage medium storing instructions which when executed by a processor cause the processor to perform:

receiving a target video;

obtaining scene description information of a shooting scene in a sequence of images in the target video, the scene description information indicating features of the shooting scene in the sequence of images in the target video;

obtaining a video processing package that is determined to correspond to the shooting scene in the sequence of images in the target video based on i) a context of a reference scene based on associations between different features of different images of the reference scene in a sequence of images in a reference video to which the video processing package was previously applied and ii) a context of the shooting scene based on associations between the features of different images of the shooting scene in the sequence of images in the target video indicated by the scene description information, the video processing package being configured to add at least one content to the target video; and adding at least one content to the target video based on the video processing package.

18. The non-transitory computer-readable storage medium according to claim 17, wherein the at least one content added by the video processing package includes at least one of visual content or audio content.

19. The non-transitory computer-readable storage medium according to claim 17, wherein the at least one content added by the obtained video processing package includes visual content and audio content.

20. The non-transitory computer-readable storage medium according to claim 17, wherein the obtaining the video processing package comprises:

obtaining the video processing package that corresponds to the shooting scene in the target video based on a predetermined video processing package applied to another video.

* * * * *